United States Patent
Kumar et al.

(10) Patent No.: US 11,671,934 B2
(45) Date of Patent: Jun. 6, 2023

(54) METHODS AND SYSTEMS FOR MANAGING ON-BOARDING PROCEDURE IN WIRELESS COMMUNICATION NETWORK

(71) Applicant: Samsung Electronics Co., Ltd., Suwon-si (KR)

(72) Inventors: Lalith Kumar, Bangalore (IN); Alok Kumar Jangid, Bangalore (IN); Kailash Kumar Jha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 17/385,701

(22) Filed: Jul. 26, 2021

(65) Prior Publication Data

US 2022/0030539 A1 Jan. 27, 2022

(30) Foreign Application Priority Data

Jul. 24, 2020 (IN) ............................. 202041031839
Jul. 19, 2021 (IN) ............................. 202041031839

(51) Int. Cl.
*H04W 60/04* (2009.01)
*H04W 60/06* (2009.01)

(52) U.S. Cl.
CPC ........... *H04W 60/04* (2013.01); *H04W 60/06* (2013.01)

(58) Field of Classification Search
CPC .............................. H04W 60/04; H04W 60/06
See application file for complete search history.

(56) References Cited

U.S. PATENT DOCUMENTS

2020/0015311 A1 1/2020 Kim
2021/0058784 A1* 2/2021 Kedalagudde ........ H04W 48/18
2021/0211879 A1* 7/2021 Zisimopoulos ....... H04W 12/37

OTHER PUBLICATIONS

International Search Report and Written Opinion of the International Searching Authority dated Oct. 22, 2021, in connection with International Application No. PCT/KR2021/009596, 9 pages.
3GPP TR 23.700-07 V0.4.0 (Jun. 2020), Technical Report, 3rd Generation Partnership Project; Technical Specification Group Services and System Aspects; Study on enhanced support of non-public networks (Release 17), Jun. 2020, 159 pages.

(Continued)

*Primary Examiner* — Marcus Hammonds

(57) ABSTRACT

The present disclosure relates to a pre-5th generation (5G) or 5G communication system to be provided for supporting higher data rates beyond 4th generation (4G) communication system such as long term evolution (LTE). Embodiments herein disclose methods for managing an on-boarding procedure in a wireless communication network. The method includes triggering, by a User Equipment (UE), a registration request for an on-boarding procedure to a network entity. Further, the method includes receiving, by the UE, a Non-access stratum (NAS) message comprising at least one information from the network entity based on the registration request. Further, the method includes performing, by the UE, at least one action based on the at least one received information. Further, the method includes managing, by the UE, the on-boarding procedure in the wireless communication network based on the at least one action.

16 Claims, 14 Drawing Sheets

(56) References Cited

OTHER PUBLICATIONS

Ericsson, "Control Plane based solution to onboarding KI#4," S2-2001534, 3GPP TSG-SA WG2 Meeting #136AH, Incheon, Korea, Jan. 13-18, 2020, 7 pages.
Ericsson, "KI#4, New Sol: General Onboarding procedure supporting both User and Control Plane UE Provisioning Procedures," S2-2004364, SA WG2 Meeting #139E, Elbonia, Jun. 1-12, 2020, 11 pages.
Huawei, et al., "New Solution UE onboarding and provisioning for SNPN subscription," S2-2000645, SA WG2 Meeting #136AH, Incheon, South Korea, Jan. 13-17, 2020, 8 pages.

* cited by examiner

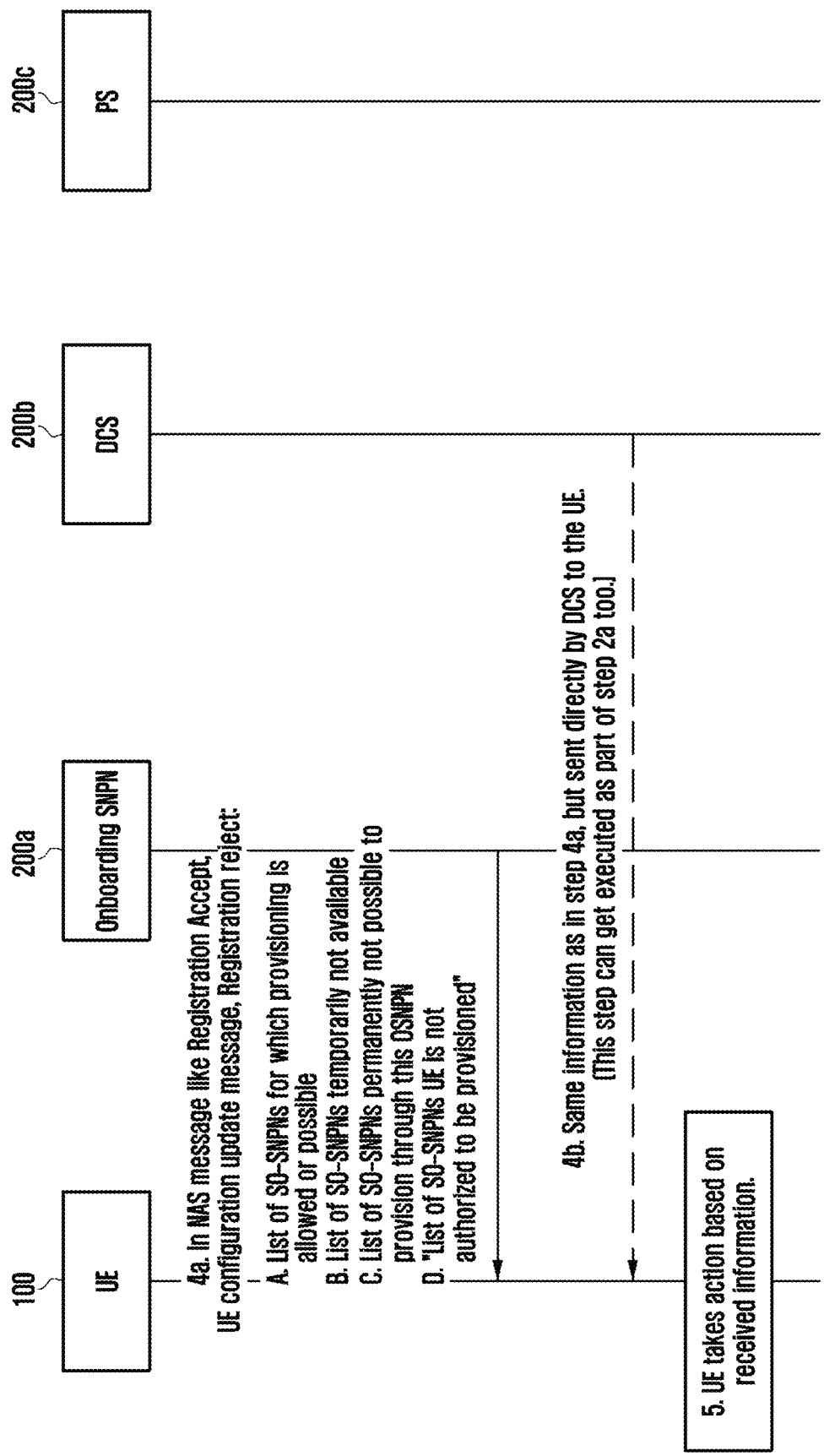

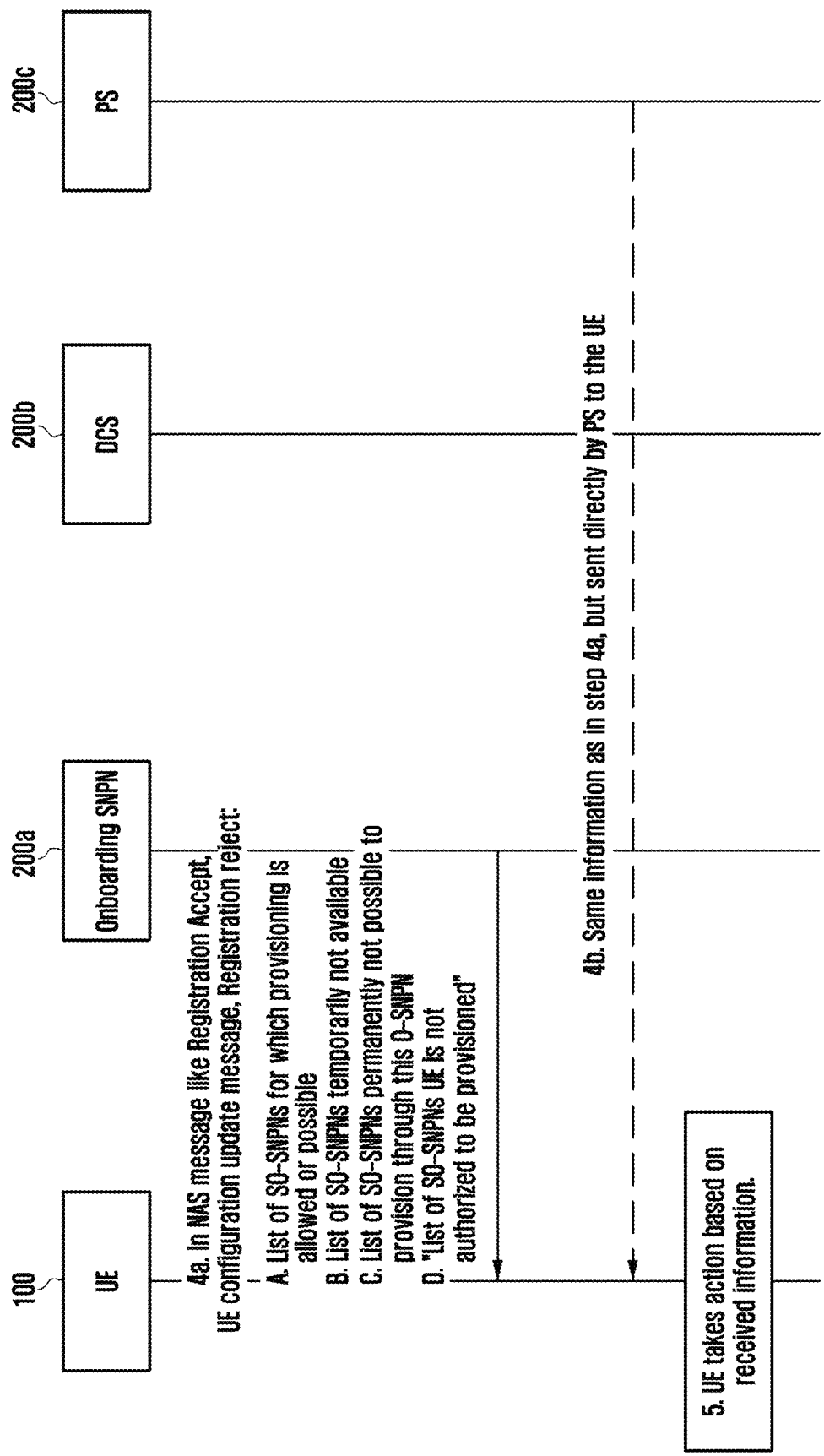

METHODS AND SYSTEMS FOR MANAGING ON-BOARDING PROCEDURE IN WIRELESS COMMUNICATION NETWORK

CROSS REFERENCE TO RELATED APPLICATIONS

This application is based on and claims priority under 35 U.S.C. 119(a) to Indian Provisional Patent Application No. 202041031839 filed on Jul. 24, 2020, and Indian Non-Provisional Patent Application No. 202041031839 filed on Jul. 19, 2021 in the Indian Patent Office, the disclosures of which are herein incorporated by reference in their entirety.

BACKGROUND

1. Field

Embodiments disclosed herein relate to a wireless communication network, and more particularly to methods and systems for managing provisioning procedure in the wireless communication network (e.g., Fifth Generation (5G) communication networks or the like).

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, a provisioning procedure is to configure a User Equipment (UE) with the subscription or default credentials of a home service provider i.e., Home Public Land Mobile Network (HPLMN) or a home Stand-alone Non-Public Network (SNPN).

Provisioning or onboarding procedures can be of two types:

CP (Control Plane) based provisioning: In the CP based provisioning, the user plane resources are not established. The provision information is provided to the UE by a provision server through an onboarding public land mobile network (PLMN), using the control plane-based procedures, i.e., sent to the UE using signalling messages like downlink (DL) non-access stratum (NAS) TRANSPORT or UE CONFIGURATION UPDATE or any other NAS message.

UP (User Plane) based provisioning: In the UP based provisioning, the user plane resources are established, i.e., the UE, after receiving an indication that UP based provisioning is required, will initiate a protocol data unit (PDU) session for on boarding. This PDU session information is provided by the network to the UE or it can be pre-configured in the UE. Once the PDU session has been established, the UE is provided with the required provisioning information by using the user plane resources of this PDU session network.

FIGS. 1A and 1B depict currently available solutions for provisioning a device (e.g., UE). The UE (100) initiates a registration procedure for the purpose of on boarding. The UE (100) provides an identity of the UE (100) and a list of SO-SNPN's the UE wants to get provisioned with. An onboarding AMF (200*d*) identifies a DCS (200B) by looking at the UE identity or the information provided by the UE (100) to the onboarding AMF (200*d*). The AMF (200*d*) will contact the DCS (200B) and provide the information of the UE (100) to the DCS (200B). The DCS (200B) based on this received information triggers authentication and security related procedures. The onboarding PLMN (for example, the AMF (200*d*)) is informed when an authentication procedure is successful. The DCS (200B) also provides a list of SO-SNPNs the UE is required to get the onboarding procedure of The O-SNPN (200*a*) will indicate that authentication was successful to a provisioning server (200*c*) along with the identity of the UE (100). The provisioning server (200*c*) will decide whether to provision the UE (100) using the UP resources mechanism or the CP based mechanism, based on the UEs subscription. The AMF (200*d*) delegates to the UE (100), this information of selection of the CP or UP based mechanism to provision the UE. The O-SNPN (200*a*) facilitates i.e., it becomes the enabler for the provisioning procedure. The UE (100) is onboarded with subscription information of the list of SO-SNPNs from all the SO-SNPNs (it can be an individual provisioning server or a common provisioning server for all the SO-SNPNs or different combinations of it).

The principal object of the embodiments herein is to disclose methods and systems for managing a provisioning procedure in the wireless communication network (e.g., Fifth Generation (5G) communication networks or the like), when the UE is roaming.

SUMMARY

Accordingly, the embodiments herein disclose methods for managing an on-boarding procedure in a wireless communication network. The method includes triggering, by a UE, a registration request for an on-boarding procedure to a network entity. Further, the method includes receiving, by the UE, a Non-access stratum (NAS) message comprising at least one information from the network entity based on the registration request. Further, the method includes performing, by the UE, at least one action based on the at least one received information. Further, the method includes managing, by the UE, the on-boarding procedure in the wireless communication network based on the at least one action.

In an embodiment, the network entity includes an onboarding Standalone Non-Public Network (SNPN), a Default Credential Server (DCS), a Provisioning Server (PS) and an Access and Mobility Management Function (AMF) entity.

In an embodiment, the registration request includes an SO-SNPN for which on-boarding is required to be done and at least one of information of a provisioning server and at least one address associated with a DCS.

In an embodiment, the NAS message includes for example a registration accept message and a UE configuration update message.

In an embodiment, the at least one information includes a list of Subscription Owner-SNPSs (SO-SNPNs) for which on-boarding is allowed, a list of SO-SNPNs temporarily not available, a list of SO-SNPNs permanently not possible to provision through an O-SNPN, and a list of SO-SNPNs the UE is not authorized to be provisioned.

In an embodiment, the at least one information includes at least one DCS through which on-boarding is allowed, at least one DCS temporarily not available, at least one DCS permanently not possible to provision through an O-SNPN, and at least one DCS the UE is not authorized to be provisioned.

In an embodiment, in response to receiving a list of SO-SNPNs for which on-boarding is allowed, the network entity performs at least one of: obtain an on-boarding done for a list of SO-SNPNs for which on-boarding is allowed, perform a deregistration procedure with a current O-SNPN and perform a public land mobile network (PLMN) search to select another O-SNPN to receive an on-boarding information for all required SO-SNPNs, and perform a deregistration procedure with a current O-SNPN and perform the PLMN search to select another O-SNPN to receive the on-boarding information for the rest of other SO-SNPNs after getting provisioned for allowed SO-SNPNs on a current O-SNPN.

In an embodiment, in response to receiving the information comprising a list of SO-SNPNs temporarily not available and a timer is provided along with the list of SO-SNPNs, the network entity performs at least one of: retry an on-boarding for a list of SO-SNPNs temporarily not available after one of a predefined time value and expiry of a timer received associated with the information, and perform a deregistration procedure with a current O-SNPN and perform a PLMN search to select another O-SNPN to receive the on-boarding information for all SO-SNPNs.

In an embodiment, the deregistration procedure can be executed between the UE and the network explicitly with NAS signalling or the UE can enter a Deregistered state without peer to peer signalling.

In an embodiment, in response to receiving the information comprising a list of SO-SNPNs permanently not possible to provision through the O-SNPN, the network entity obtains an on-boarding done for a list of SO-SNPNs for which on-boarding is allowed, performs a deregistration procedure with a current O-SNPN and performs a PLMN search to select another O-SNPN to receive the on-boarding information for all required SO-SNPNs, and performs a deregistration procedure with a current O-SNPN and performs the PLMN search to select another O-SNPN to receive the on-boarding information for rest of the other SO-SNPNs after getting provisioned for the allowed SO-SNPNs on the current O-SNPN.

In an embodiment, in response to receiving the information comprising a list of SO-SNPNs the UE is not authorized to be provisioned, the at least one action includes not attempting to obtain the provisioned for the SO-SNPNs, wherein the information is received from a DCS and protected by the DCS, wherein the UE attempts to get provisioned for the SO-SNPNs based on a value associated with a timer.

In an embodiment, in response to receiving the information comprising at least one of DCSs for which on-boarding is allowed, the at least one action includes obtaining an on-boarding done for a list of DCSs for which on-boarding is allowed, performing a deregistration procedure with a current O-SNPN and does a PLMN search to select another O-SNPN which supports all the required DCS to receive an on-boarding information for all the required SO-SNPNs by the UE, and performing a deregistration procedure with a current O-SNPN and performing the PLMN search to select another O-SNPN to receive the on-boarding information for the rest of the other SO-SNPNs for which the DCS support is not available in the current O-SNPN.

In an embodiment, in response to receiving the information comprising at least one of DCSs temporarily not available and a timer is provided along with a DCSs list, the at least one action includes retrying an on-boarding for a list of SO-SNPNs for which DCSs are not available temporarily after one of a predefined time value or after expiry of a timer received associated with the information, and performing a deregistration procedure with a current O-SNPN and does a PLMN search to select another O-SNPN to receive the on-boarding information for all the required SO-SNPNs together for which DCSs are not available with the current O-SNPN, In an embodiment, in response to receiving the information comprising at least one of DCSs permanently not possible to provision through the O-SNPN, the at least one action includes obtaining an on-boarding done for a list of SO-SNPNs for which on-boarding is allowed, and performing a deregistration procedure with a current O-SNPN and does a PLMN SEARCH to select another O-SNPN which supports all the DCSs to receive the on-boarding information for all the required SO-SNPNs.

In an embodiment, in response to receiving the information comprising at least one of DCSs the UE is not authorized to be provisioned, the at least one action includes not attempting to get provisioned for the SO-SNPNs again which are associated with the DCS present in the list of SO-SNPNs, wherein the information is received and protected from the DCS using an integrity protected message, wherein the information is protected by the DCS, wherein the UE attempts to get provisioned for the SO-SNPNs based on a value associated with a timer.

In an embodiment, the information includes a reject cause indicating a mismatch provisioned parameter reject, a first time interval indicating an on-boarding and registration are valid up to the first time interval, a second time interval indicating a provisioned information valid after the second time interval, and a reject cause#75.

In an embodiment, the at least one action comprises performing at least one of: marking on-boarding information as invalid and deleting the on-boarding information from the UE after expiry of the first time interval, using the provisioned information as valid after the second time interval, restarting the on boarding procedure when an SO-SNPN identifies that provisioned information is not correct and a required parameter associated with the provisioned information is missing and is indicated to the UE in response to receiving a reject cause indicating a mismatch provisioned parameter reject; and performing at least one of: performing an on-boarding procedure if a default subscription credential is deleted, and an application running in the UE to retrigger registration on the SNPN if the default subscription credential is not deleted and the default subscription credential is marked as invalid, when the reject cause#75 indicates that the SNPN is permanently not authorized for the SNPN and the UE deletes a current default credential of the current SNPN.

In an embodiment, receiving, by the UE, the NAS message comprising at least one information from the network entity based on the registration request includes performing an authentication and security related procedure using a network entity, and receiving, by the UE, the NAS message comprising at least one information from the network entity based on the authentication and security related procedure.

Accordingly, the embodiments herein disclose methods for managing an on-boarding procedure in a wireless communication network. The method includes receiving, by a network entity, a registration request for an on-boarding procedure from a UE. Further, the method includes sending, by the network entity, a NAS message comprising at least one information to the UE based on the registration request. Further, the method includes managing, by the network entity, the on-boarding procedure in the wireless communication network based on the at least one information.

Accordingly, the embodiments herein disclose a UE for managing an on-boarding procedure in a wireless communication network. The UE includes an on-boarding procedure handling controller coupled with a memory and a processor. Further, the on-boarding procedure handling controller is configured to trigger a registration request for an on-boarding procedure to a network entity. Further, the on-boarding procedure handling controller is configured to receive a NAS message comprising at least one information from the network entity based on the registration request. Further, the on-boarding procedure handling controller is configured to perform at least one action based on the at least one received information. Further, the on-boarding procedure handling controller is configured to manage the on-boarding procedure in the wireless communication network based on the at least one action.

Accordingly, the embodiments herein disclose a network entity for managing an on-boarding procedure in a wireless communication network. The network entity includes an on-boarding procedure handling controller coupled with a memory and a processor. The on-boarding procedure handling controller is configured to receive a registration request for an on-boarding procedure from a UE and send a NAS message including at least one information to the UE based on the registration request. Further, the on-boarding procedure handling controller is configured to manage the on-boarding procedure in the wireless communication network based on the at least one information.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9B illustrates an example scenario in which the UE manages the provisioning procedure in the wireless communication network, where the DCS indicates to the O-SNPN, the list of SO-SNPNs allowed based on the UE's subscription information, according to embodiments as disclosed herein;

FIG. 10B illustrates an example scenario in which the UE manages the provisioning procedure in the wireless communication network, where the PS indicates to the O-SNPN list of the SO-SNPNs allowed, based on the UE's subscription information, according to embodiments as disclosed herein.

DETAILED DESCRIPTION

Figure 1A:
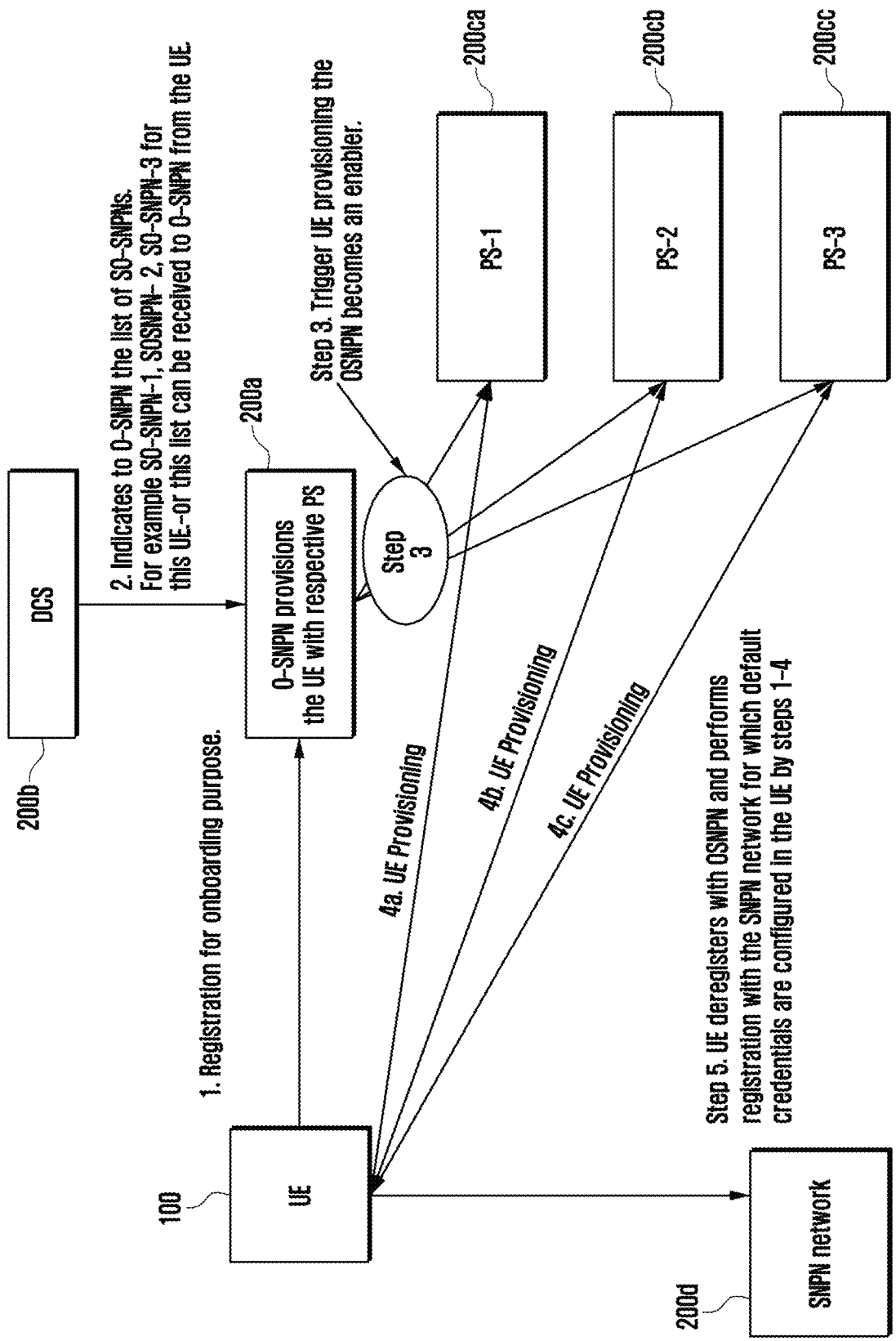
FIG. 1A and FIG. 1B depict currently available solutions for provisioning a UE.
Figure 1B:
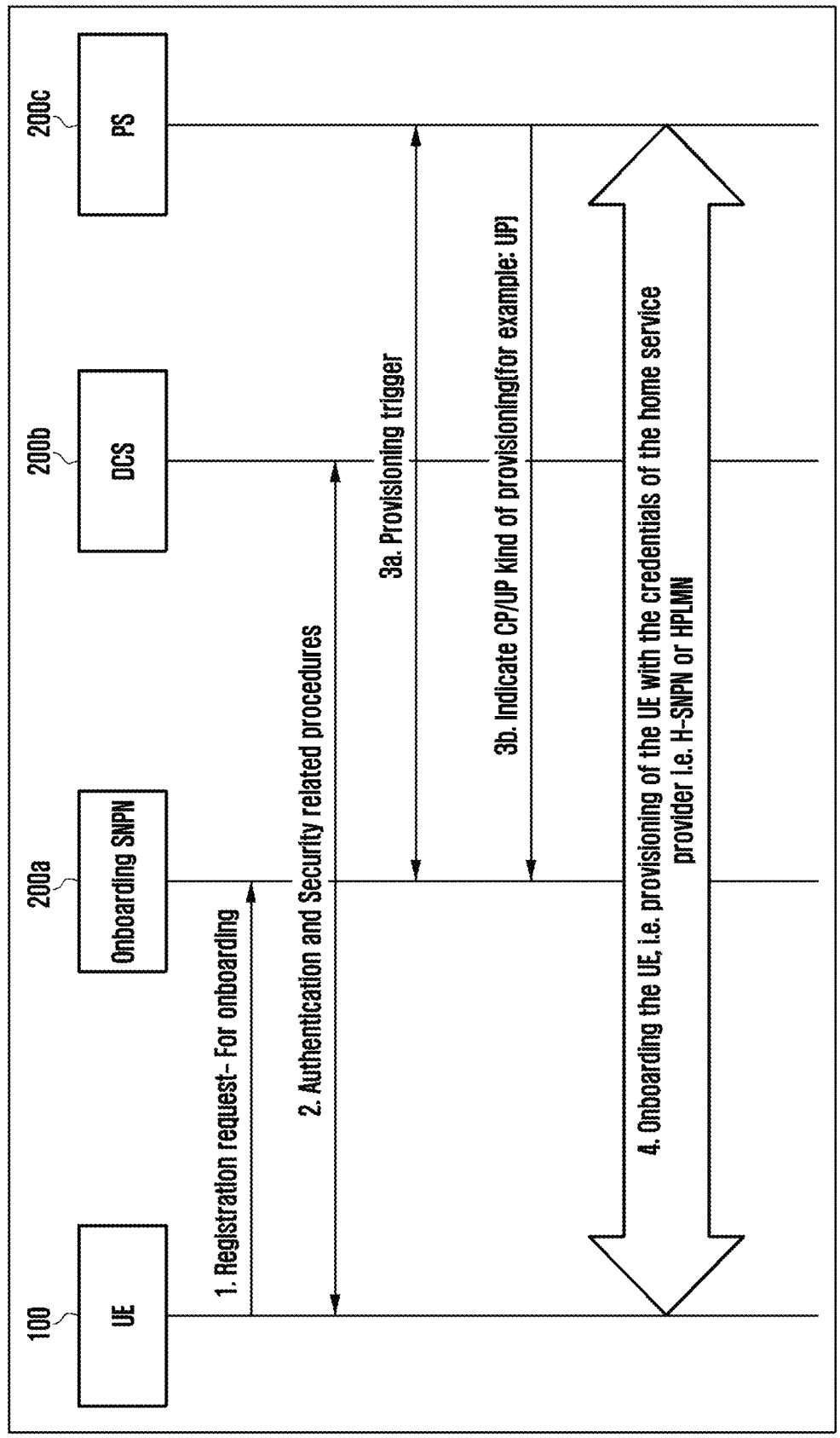

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for managing an on-boarding procedure in a wireless communication network. The method includes triggering, by a UE, a registration request for an on-boarding procedure to a network entity. Further, the method includes receiving, by the UE, a NAS message comprising at least one information from the network entity based on the registration request. Further, the method includes performing, by the UE, at least one action based on the at least one received information. Further, the method includes managing, by the UE, the on-boarding procedure in the wireless communication network based on the at least one action.

The proposed method can be used for managing the provisioning procedure in the wireless communication network in a quick manner, when the UE is in a roaming area. This results in enhancing the user experience.

Referring now to the drawings, and more particularly to FIGS. 2 through 11, where similar reference characters denote corresponding features consistently throughout the figures, there are shown at least one embodiment.

Embodiments herein use the following terms:

1. Default UE credentials: Information that the UE has before the actual onboarding procedure to make it uniquely identifiable and verifiably secure.

2. Default Credential Server (DCS): The server that can authenticate a UE with default UE credentials or provide means to another entity to do it. The DCS can be connected through AUSF of the O-SNPN.

3. NPN: Non-Public Network as defined in TS 23.501. The terminology NPN refers to both SNPN and PNI-NPN in this embodiment unless otherwise stated.

4. NPN credentials: Information that the UE uses for authentication to access an NPN. NPN credentials may be 3GPP credentials or non-3GPP credentials.

5. Onboarding Network (ON): The network providing initial registration and/or access to the UE for UE Onboarding. This is also called as O-SNPN, the terminology onboarding AMF may be used but it should be treated as an example it refers to any of the network nodes of the onboarding network.

6. Provisioning Server (PS): The server that provisions the authenticated/authorized UE with the subscription data and optionally other configuration information of the subscription owner or credential holder network.

7. Subscription Owner (SO): The entity that stores and as a result of the UE Onboarding procedures provides the subscription data and optionally other configuration information via the PS to the UE.

8. UE Onboarding: Provisioning of information, to a UE and within the network, required for the UE to get authorized access and connectivity to an NPN.

9. Unique UE identifier: Identifying the UE in the network and the DCS and is assigned and configured by the DCS.

The terms PLMN and SNPN have been used interchangeably in this document, and the terms represent onboarding PLMN or onboarding SNPN, Subscription Owner PLMN or Subscription Owner SNPN or the like. The terms onboarding and provisioning have been used interchangeably in this document and they are synonyms to each other.

Figure 2:
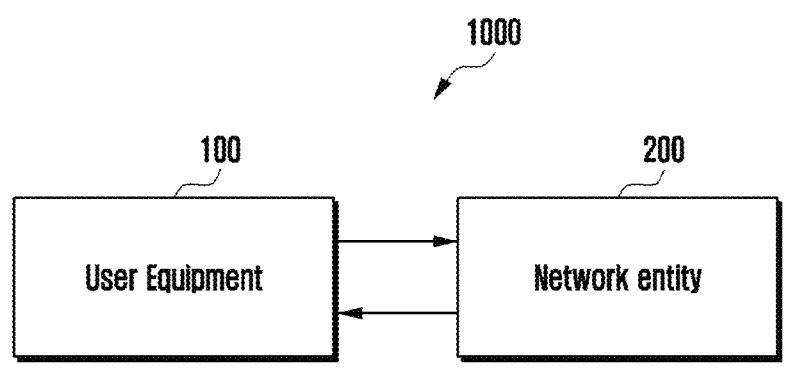
FIG. 2 illustrates an overview of a wireless communication network for managing a provisioning procedure, according to embodiments as disclosed herein.

FIG. 2 is an overview of a wireless communication network (1000) for managing a provisioning procedure, according to embodiments as disclosed herein. In an embodiment, the wireless communication network (1000) includes the UE (100) and the network entity (200). The UE (100) can be, for example, but not limited to a laptop, a desktop computer, a notebook, a relay device, a Device-to-Device (D2D) device, a vehicle to everything (V2X) device, a smartphone, a tablet, an internet of things (IoT) device, an immersive device or the like. The network entity (200) can be, for example, but not limited to an onboarding SNPN (200*a*), a DCS (200*b*), a PS (200*c*) and an AMF entity (200*d*).

The UE (100) triggers a registration request for an on-boarding procedure to the network entity (200). In an embodiment, the registration request includes an SO-SNPN for which provisioning is required to be done and an information of the provisioning server (200c) and an address associated with a DCS (200b). The network entity (200) receives the registration request for the on-boarding procedure from the UE (100) and sends an NAS message including one or more information to the UE (100). The NAS message includes a registration accept message and a UE configuration update message. The NAS message including the one or more information from the network entity (200) is received by performing an authentication and security related procedure.

Based on the registration request, the UE (100) receives a NAS message including one or more information from the network entity (200). Based on the one or more received information, the UE (100) performs one or more action. The one or more information and the one or more action are explained in the FIG. 7 to the FIG. 11.

Figure 3:
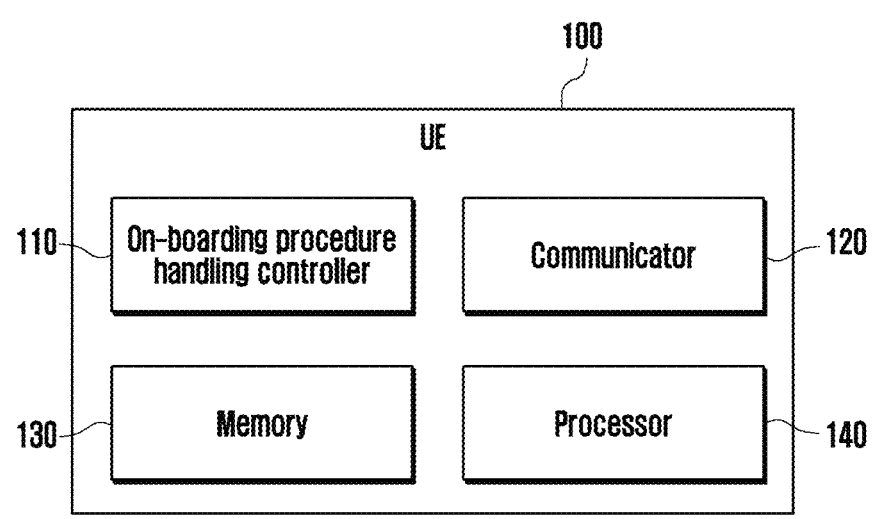
FIG. 3 shows various hardware components of a UE for managing the provisioning procedure in the wireless communication network, according to embodiments as disclosed herein.

FIG. 3 shows various hardware components of the UE (100) for managing the provisioning procedure in the wireless communication network (1000), according to embodiments as disclosed herein. In an embodiment, the UE (100) includes an on-boarding procedure handling controller (110), a communicator (120), a memory (130) and a processor (140). The processor (140) is coupled with the on-boarding procedure handling controller (110), the communicator (120) and the memory (130). The on-boarding procedure handling controller (110) is configured to trigger the registration request for the on-boarding procedure to the network entity (200). Based on the registration request, the on-boarding procedure handling controller (110) is configured to receive the NAS message including the information from the network entity (200). Based on the received information, the on-boarding procedure handling controller (110) is configured to perform the one or more action. The information and the one or more action are explained in the FIG. 7 to the FIG. 11.

Further, the processor (140) is configured to execute instructions stored in the memory (130) and to perform various processes. The communicator (120) is configured for communicating internally between internal hardware components and with external devices via one or more networks. The memory (130) also stores instructions to be executed by the processor (140). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (140). The processor (140) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3 shows various hardware components of the UE (100), it is to be understood that other embodiments are not limited thereto. In other embodiments, the UE (100) may include less or more number of components. Further, the labels or names of the components are used only for illustrative purpose and does not limit the scope of the disclosure. One or more components can be combined together to perform the same or substantially similar function in the UE (100).

Figure 4:
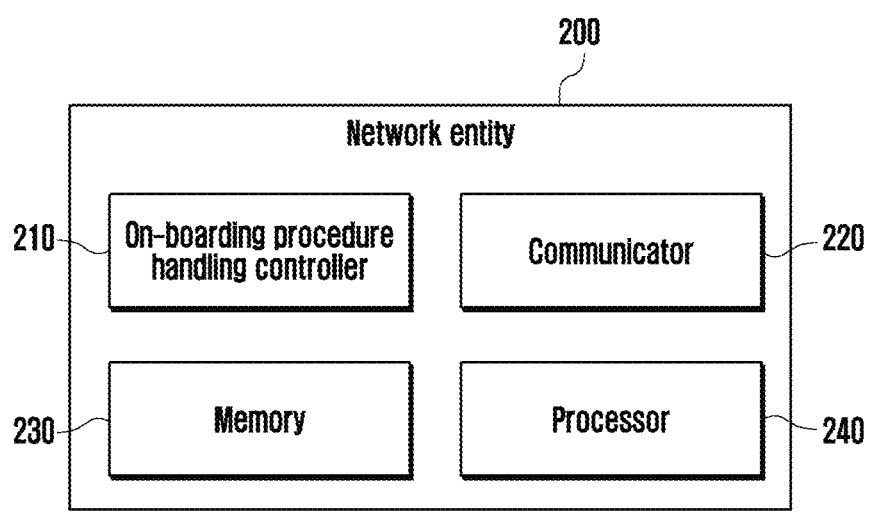
FIG. 4 shows various hardware components of a network entity for managing the provisioning procedure in the wireless communication network, according to embodiments as disclosed herein.

FIG. 4 shows various hardware components of the network entity (200) for managing the provisioning procedure in the wireless communication network (1000), according to embodiments as disclosed herein. In an embodiment, the network entity (200) includes an on-boarding procedure handling controller (210), a communicator (220), a memory (230) and a processor (240). The processor (240) is coupled with the on-boarding procedure handling controller (210), the communicator (220) and the memory (230). In an embodiment, the on-boarding procedure handling controller (210) is configured to receive the registration request for the on-boarding procedure from the UE (100). Based on the registration request, the on-boarding procedure handling controller (210) is configured to send the NAS message including the one or more information to the UE (100).

Further, the processor (240) is configured to execute instructions stored in the memory (230) and to perform various processes. The communicator (220) is configured for communicating internally between internal hardware components and with external devices via one or more networks. The memory (230) also stores instructions to be executed by the processor (240). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (240). The processor (240) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 4 shows various hardware components of the network entity (200), it is to be understood that other embodiments are not limited thereto. In other embodiments, the network entity (200) may include less or more number of components. Further, the labels or names of the components are used only for illustrative purpose and does not limit the scope of the disclosure. One or more components can be combined together to perform same or substantially similar function in the network entity (200).

Figure 5:
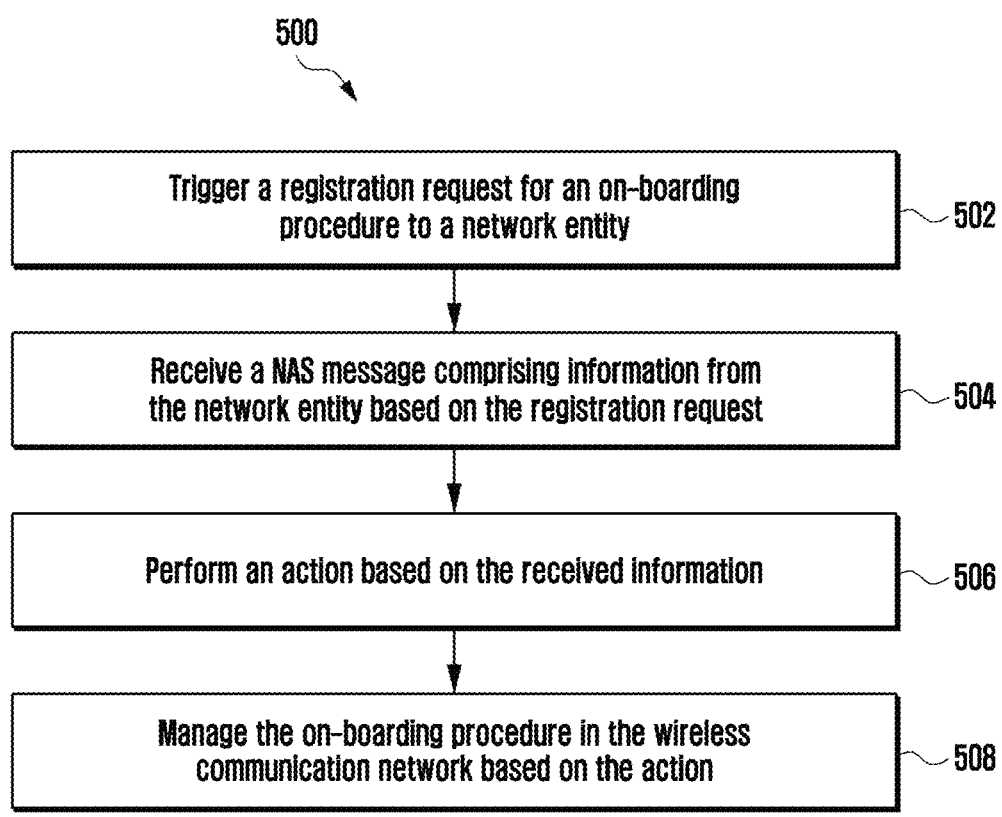
FIG. 5 illustrates a flow chart of a method, implemented by the UE, for managing the on-boarding procedure in the wireless communication network, according to embodiments as disclosed herein.

FIG. 5 illustrates a flow chart (500) of a method, implemented by the UE (100), for managing the on-boarding procedure in the wireless communication network (1000), according to embodiments as disclosed herein. The operations (502-508) are handled by the on-boarding procedure handling controller (110). At 502, the method includes triggering the registration request for the on-boarding procedure to the network entity (200). At 504, the method includes receiving the NAS message including the information from the network entity (200) based on the registration request. At 506, the method includes performing the action based on the received information. At 508, the method includes managing the on-boarding procedure in the wireless communication network (1000) based on the action.

Figure 6:
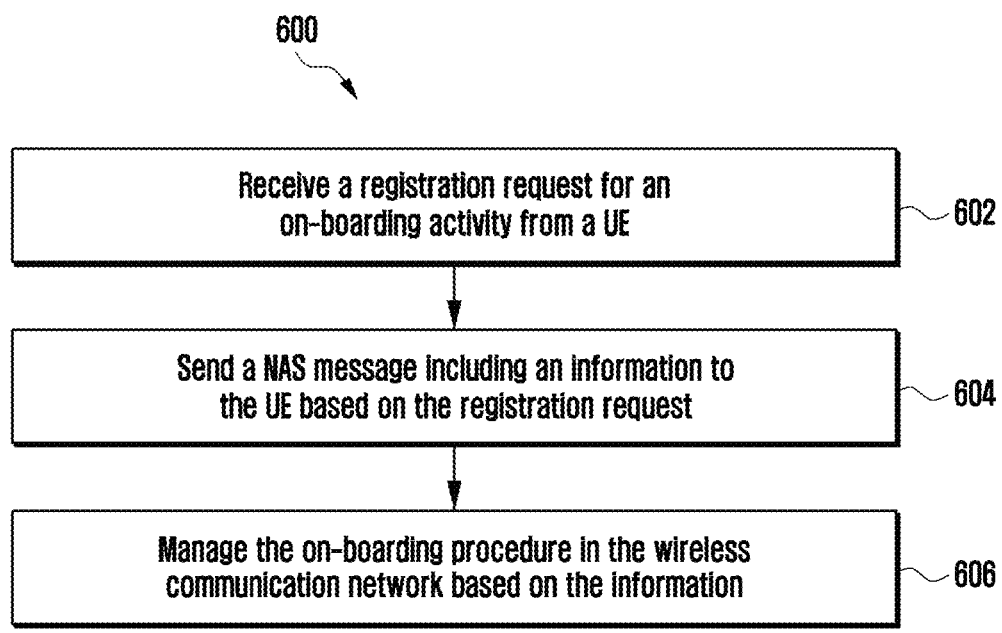
FIG. 6 illustrates a flow chart of a method, implemented by the network entity, for managing the on-boarding procedure in the wireless communication network, according to embodiments as disclosed herein.

FIG. 6 illustrates a flow chart (600) of a method, implemented by the network entity (200), for managing the on-boarding procedure in the wireless communication network (1000), according to embodiments as disclosed herein. The operations (602-606) are handled by the on-boarding procedure handling controller (210). At 602, the method includes receiving the registration request for the on-boarding procedure from the UE (100). At 604, the method includes sending the NAS message including the information to the UE (100) based on the registration request. At 606, the method includes managing the on-boarding procedure in the wireless communication network (1000) based on the at least one information.

Figure 7:
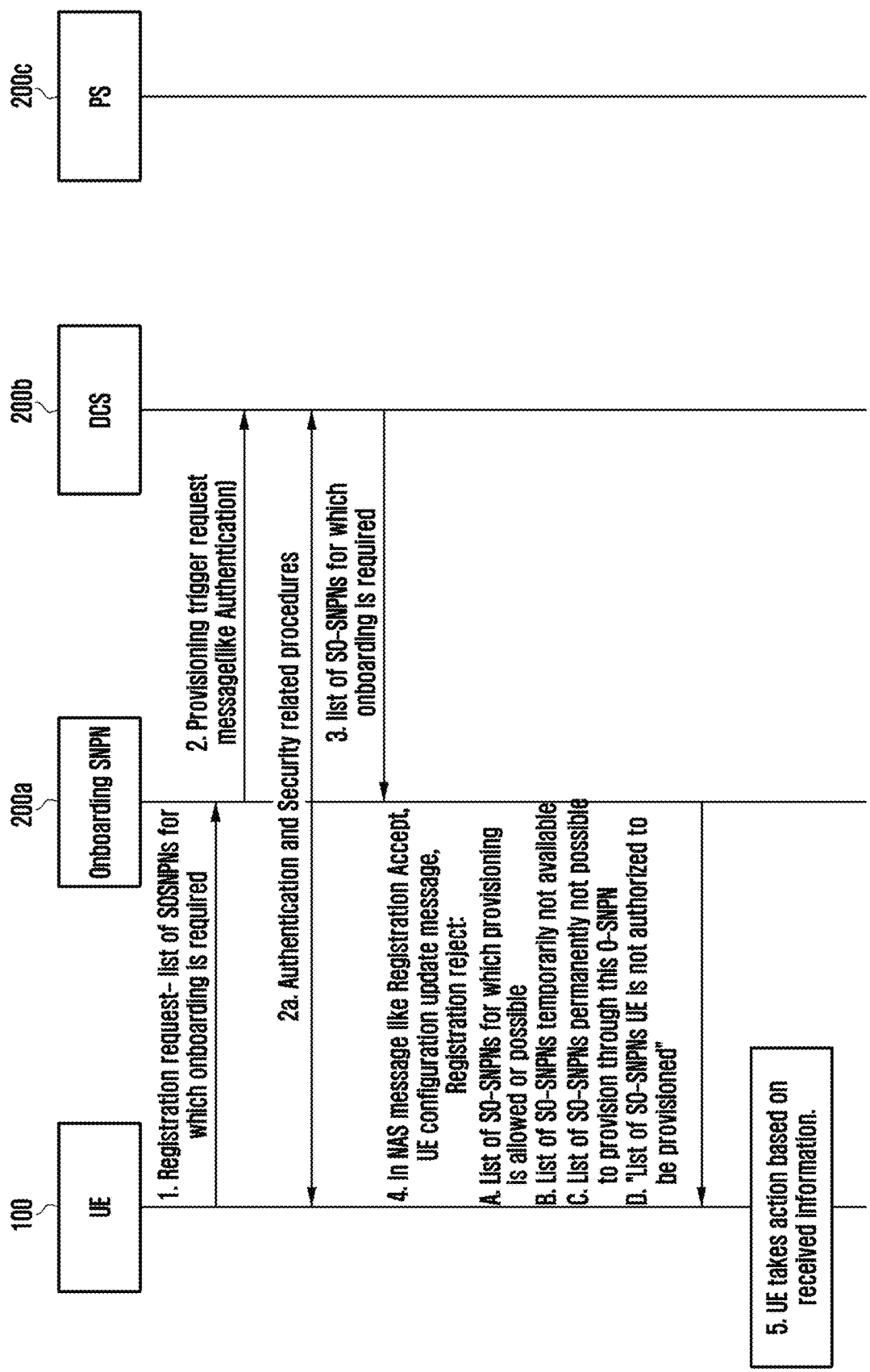
FIG. 7 illustrates an example scenario in which the UE manages the provisioning procedure in the wireless communication network, when there is no agreement between the O-SNPN and the PS/SO-SNPN, according to embodiments as disclosed herein

FIG. 7 illustrates an example scenario in which the UE (100) manages the provisioning procedure in the wireless communication network (1000), when there is no agreement between the O-SNPN (200a) and the PS (200c)/SO-SNPN, according to embodiments as disclosed herein.

As shown in the FIG. 7, the UE (100) triggers a registration procedure for onboarding purpose. The registration request may include the SO-SNPN for which provisioning is required to be done. Optionally, the provisioning server information is also included. The SO-SNPN (for example, the AMF (200d)) will initiate an authentication request with the DCS (200B). After or during the authentication procedure, the DCS (200B) indicates to the SO-SNPN (for example, the AMF (200d)) the list of SO-SNPNs required to be provisioned for this UE (100). At this point, the AMF (200d) will have a list of SO-SNPNs for which provisioning is required. But, the SO-SNPN may not have agreements with some or all of those SO-SNPNs or some or all of the provisioning servers (200c) may not be reachable temporarily. Based on this, the AMF (200d) indicates to the UE (100) in a NAS message such as a REGISTRATION ACCEPT message one or more of the below information. Otherwise, if reaching the PS (200c) faces some abnormality after the registration procedure is completed, the SO-SNPN, as part of another NAS message such as a UE configuration update, indicates to the UE (100) one or more of the below information:

a. List of SO-SNPNs for which provisioning is allowed or possible.
 b. List of SO-SNPNs temporarily not available.
 c. List of SO-SNPNs permanently not possible to provision through this O-SNPN (200a).
 d. List of SO-SNPNs UE is not authorized to be provisioned.

On receiving a list of SO-SNPNs for which provisioning is allowed or possible, the UE (100) performs the below actions:

1. The UE (100) gets the provisioning done for the List of SO-SNPNs for which provisioning is allowed or possible.
 2. In yet another embodiment, the UE (100) performs the deregistration procedure by entering the deregistered state with the current O-SNPN (200a) and does a PLMN search by entering a PLMN.SEARCH state to select another O-SNPN to receive the provisioning information for all the required SO-SNPNs together. For example, if the UE (100)

triggered onboarding procedure for a single SO-SNPN and O-SNPN indicates that it cannot provision for the SO-SNPN by giving a reject cause the UE (100) performs the deregistration procedure by entering a deregistered state with the current O-SNPN (200a) and does the PLMN search by entering the PLMN.SEARCH state to select another O-SNPN to receive the provisioning information for the SO-SNPNs.

3. In an embodiment, the UE (100) performs the deregistration procedure by entering the deregistered state with the current O-SNPN (200a) and does the PLMN search by entering the PLMN. SEARCH state to select another O-SNPN to receive the provisioning information for the rest of the other SO-SNPNs after getting provisioned for the allowed SO-SNPNs on the current O-SNPN (200a).

On receiving the list of SO-SNPNs temporarily not available, the timer is optionally provided along with this list, the UE (100) performs the below actions:

1. The UE (100) retries the provisioning for this list of SO-SNPNs temporarily not available after an implementation dependent time or after expiry of the timer received associated with it.

2. In an embodiment, the UE (100) performs the deregistration procedure with the current O-SNPN (200a) and does the PLMN SEARCH to select another O-SNPN to receive the provisioning information for all the required SO-SNPNs together.

On receiving the list of SO-SNPNs permanently not possible to provision through this O-SNPN (200a), the UE (100) performs the below actions:

1. The UE (100) gets the provisioning done for the List of SO-SNPNs for which provisioning is allowed or possible.

2. In an embodiment, the UE (100) performs the deregistration procedure with the current O-SNPN (200a) and does the PLMN SEARCH to select another O-SNPN to receive the provisioning information for all the required SO-SNPNs together.

3. In an embodiment, the UE (100) performs the deregistration procedure with the current O-SNPN (200a) and does the PLMN SEARCH to select another O-SNPN to receive the provisioning information for the rest of the other SO-SNPNs after getting provisioned for the allowed SO-SNPNs on the current O-SNPN (200a).

On receiving the list of SO-SNPNs the UE (100) is not authorized to be provisioned, the UE (100) performs the below actions:

1. The UE (100) does not try to get provisioned for those SO-SNPNs again. This information may be received from the DCS (200B) and protected by the DCS (200B). The UE (100) may attempt to get provisioned for those SO-SNPNs after an implementation dependent time, or the network can provide a timer value, after which the UE (100) can again make an attempt or till the UE (100) does power off and on, i.e., switch off and on, the (U)SIM is removed i.e., the UE (100) goes back to the deregister state and so on.

Figure 8:
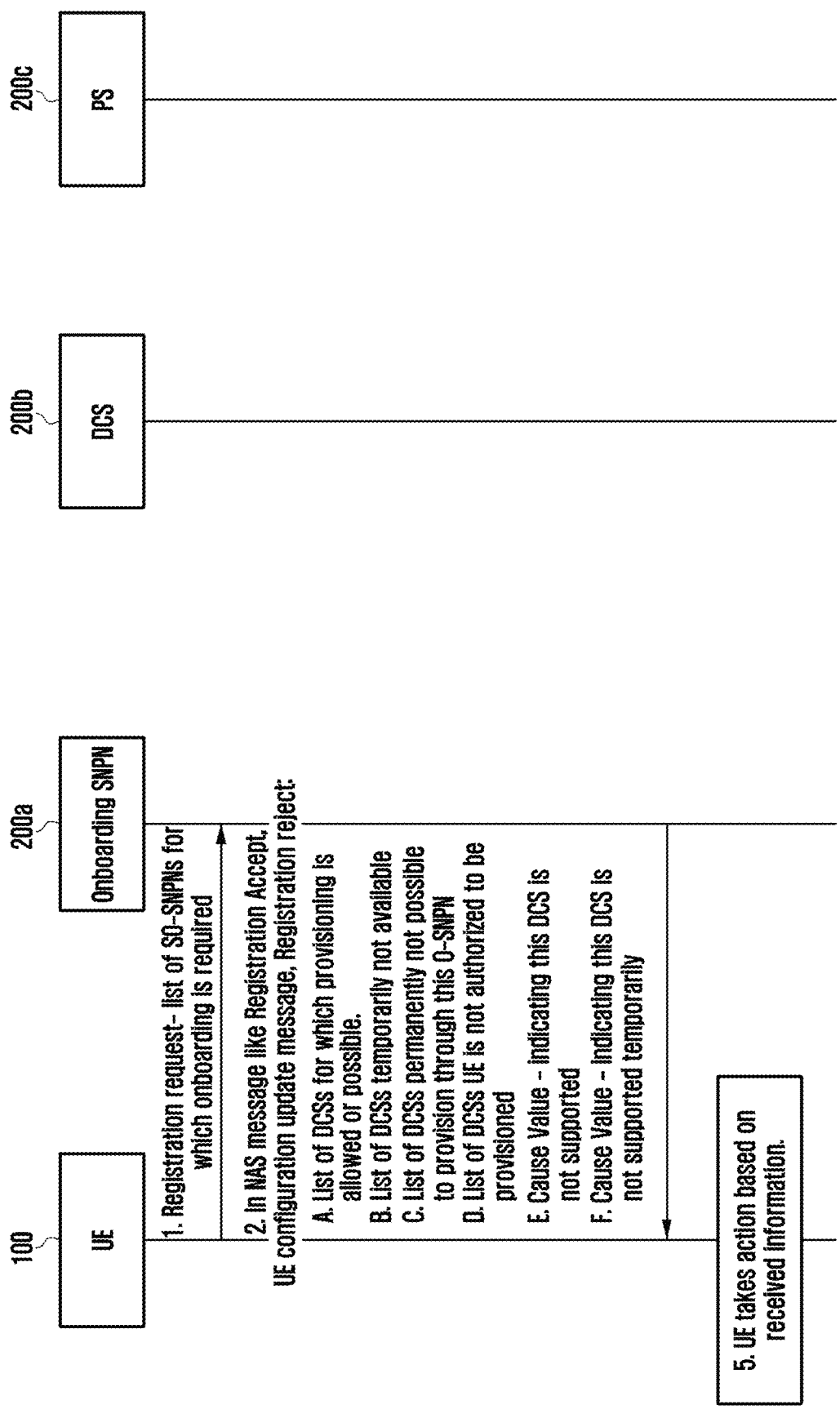
FIG. 8 illustrates an example scenario in which the UE manages the provisioning procedure in the wireless communication network, where the O-SNPN cannot identify the DCS, according to embodiments as disclosed herein.

FIG. 8 illustrates an example scenario in which the UE (100) manages the provisioning procedure in the wireless communication network (1000), where the O-SNPN (200a) cannot identify the DCS (200B), according to embodiments as disclosed herein.

As shown in FIG. 8, the UE (100) triggers a registration procedure for onboarding purpose. The registration request may include an SO-SNPN for which provisioning is required to be done. It also includes one or more DCS (200B) addresses. At this point, the AMF (200d) has a list of DCS (200B) addresses from which an authentication procedure could be executed for different combinations of O-SNPN (200a) and DCS (200B). But, the SO-SNPN may not have agreements with some of those DCSs (200B) or some of the DCSs (200B) are not reachable temporarily. Based on this, the AMF (200d) indicates to the UE (100) in a NAS message such as a REGISTRATION ACCEPT message one or more of the below information. Otherwise, if reaching the DCS (200B) faces an abnormality after the registration procedure is completed. The SO-SNPN as part of another NAS message such as a UE configuration update indicates to the UE (100) one or more of the below information:

1. One or more(list) of DCSs (200B) through which provisioning is allowed or possible.

2. One or more(list) DCSs (200B) is temporarily not available.

3. One or more(list) DCSs (200B), which are permanently not possible to provision through this O-SNPN (200a).

4. One or more(list) DCSs (200B), that is not authorized to provision the UE (100).

On receiving "One or more DCSs (200B) for which provisioning is allowed or possible", the UE (100) performs the below actions:

1. The UE (100) gets the provisioning done for the List of DCSs (200B) for which provisioning is allowed or possible.

2. In an embodiment, the UE (100) performs the deregistration procedure with the current O-SNPN (200a) and performs the PLMN SEARCH to select another O-SNPN which supports all the required DCS (200B) to receive the provisioning information for all the required SO-SNPNs by UE (100).

3. In an embodiment, the UE (100) performs the deregistration procedure with the current O-SNPN (200a) and performs the PLMN SEARCH to select another O-SNPN to receive the provisioning information for the rest of the other SO-SNPNs for which DCS (200B) support was not available in the current O-SNPN (200a).

On receiving "List of DCSs (200B) temporarily not available" optionally a timer is provided along with this list, the UE (100) performs the below actions:

1. The UE (100) retries the provisioning for this list of SO-SNPNs (for which DCSs (200B) are not available) temporarily not available after an implementation dependent time or after expiry of the timer received associated with it.

2. In an embodiment, the UE (100) performs the deregistration procedure with the current O-SNPN (200a) and performs the PLMN SEARCH to select another O-SNPN to receive the provisioning information for all the required SO-SNPNs together (for which DCSs (200B) are not available with current O-SNPN (200a)).

On receiving "List of DCSs (200B) permanently not possible to provision through this O-SNPN (200a)", the UE (100) performs the below actions:

1. The UE (100) gets the provisioning done for the List of SO-SNPNs for which provisioning is allowed or possible.

2. In an embodiment, the UE (100) performs the deregistration procedure with the current O-SNPN (200a) and performs the PLMN SEARCH to select another O-SNPN which could support all the DCSs (200B), to receive the provisioning information for all the required SO-SNPNs together.

On receiving "List of DCSs (200B) UE (100) is not authorized to be provisioned", the UE (100) performs the below actions:

A. The UE (100) does not try to get provisioned for those SO-SNPNs again, which are associated with the DCSs (200B) present in this list. Optionally this information can be received from the DCS (200B); for example, in an integrity protected message from the DCS (200B). Optionally, this information is received from the DCS (200B) and protected by the DCS (200B). The UE (100) may attempt to get provisioned for those SO-SNPNs after an implementation dependent time, or the network can provide a timer value after which the UE (100) can again make an attempt or till the UE (100) does power off and on, i.e., switch off and on, i.e., the UE (100) goes back to the deregister state and so on.

In this solution, the list of SO-SNPNs can be identified by the provisioning server address or SO-SNPN ID (i.e., PLMN ID+NID) or PLMN ID or DCS (200B) identifier or list of subscriber data etc. or any identifier for SO-SNPN configured in the UE (100).

The list of SO-SNPNs permanently not possible to provision through this O-SNPN (200*a*) is maintained by the UE (100) as a map of O-SNPN (200*a*) and the list of SO-SNPNs called as Forbidden O-SNPNs (200*a*) for the SO-SNPN list. The UE (100) shall not attempt to get provisioned for those SO-SNPNs over the O-SNPN (200*a*) marked in the forbidden O-SNPNs (200*a*) for the SO-SNPN list. The UE (100) may attempt again after timer expiry. The timer value can be provided by the network (200) or UE implementation dependent.

The list of DCS (200B) permanently not possible to provision through this O-SNPN (200*a*) is maintained by the UE (100) as a map of O-SNPN (200*a*) and the list of DCSs (200B) called as forbidden O-SNPN (200*a*) for the DCS (200B). The UE (100) shall not attempt to get provisioned with the DCS (200B) over the O-SNPN (200*a*) which is marked in the forbidden O-SNPN (200*a*) for the DCS (200B)

In an embodiment, the O-SNPN (200*a*) instead of providing the list, the O-SNPN (200*a*) can just provide a cause value. The cause value is replaced with the list information. The cause value will indicate for the requested DCN or the provision server. The UE (100) action for the respective list which is replaced with the cause value is the same except that it is applicable only for the requested DCS (200B) or the provision server or the UE identifier.

When it is discussed that the UE (100) should not request for a particular O-SNPN (200*a*) or DCS (200B) then it is also implied that the UE (100) should not use the UE identifier which is built after taking the O-SNPN (200*a*) or the DCS (200B) or the PS (200*c*) as inputs.

In an embodiment, if the UE (100) triggers registration for onboarding from a geographical location e.g., TAI but if the AMF (200*d*) or the DCS (200B) or the PS (200*c*) identifies that onboarding in that area is not allowed, this information will be delegated to the UE (100) in a NAS message; for example, in a registration reject message. Then, the UE (100) should not attempt for onboarding again on this TAIs (in general an area identifier), the UE (100) remembers this using a list for example called forbidden onboarding area list. This information delegated to the UE (100) also can be given for specific SO-SNPNs or DCS (200B) to the UE (100) and the UE (100) maintains this information accordingly. The location of the UE (100) is provided by the UE (100) to the O-SNPN (200*a*) or the O-SNPN (200*a*) core network gets the location of the UE (100) from the RAN, the O-SNPN (200*a*) passes this information to the DCS (200B) or/and the PS (200*c*), the DCS (200B) or/and the PS (200*c*) based on this received location information decides whether provisioning in that area is possible or not possible. If it is not possible, the DCS (200B) or/and PS indicates the same to the O-SNPN (200*a*) (for example, to the AMF (200*d*)) which delegates this information to the UE (100) or the DCS (200B) or/and the PS (200*c*) may directly communicate this information to the UE (100).

Figure 9A:
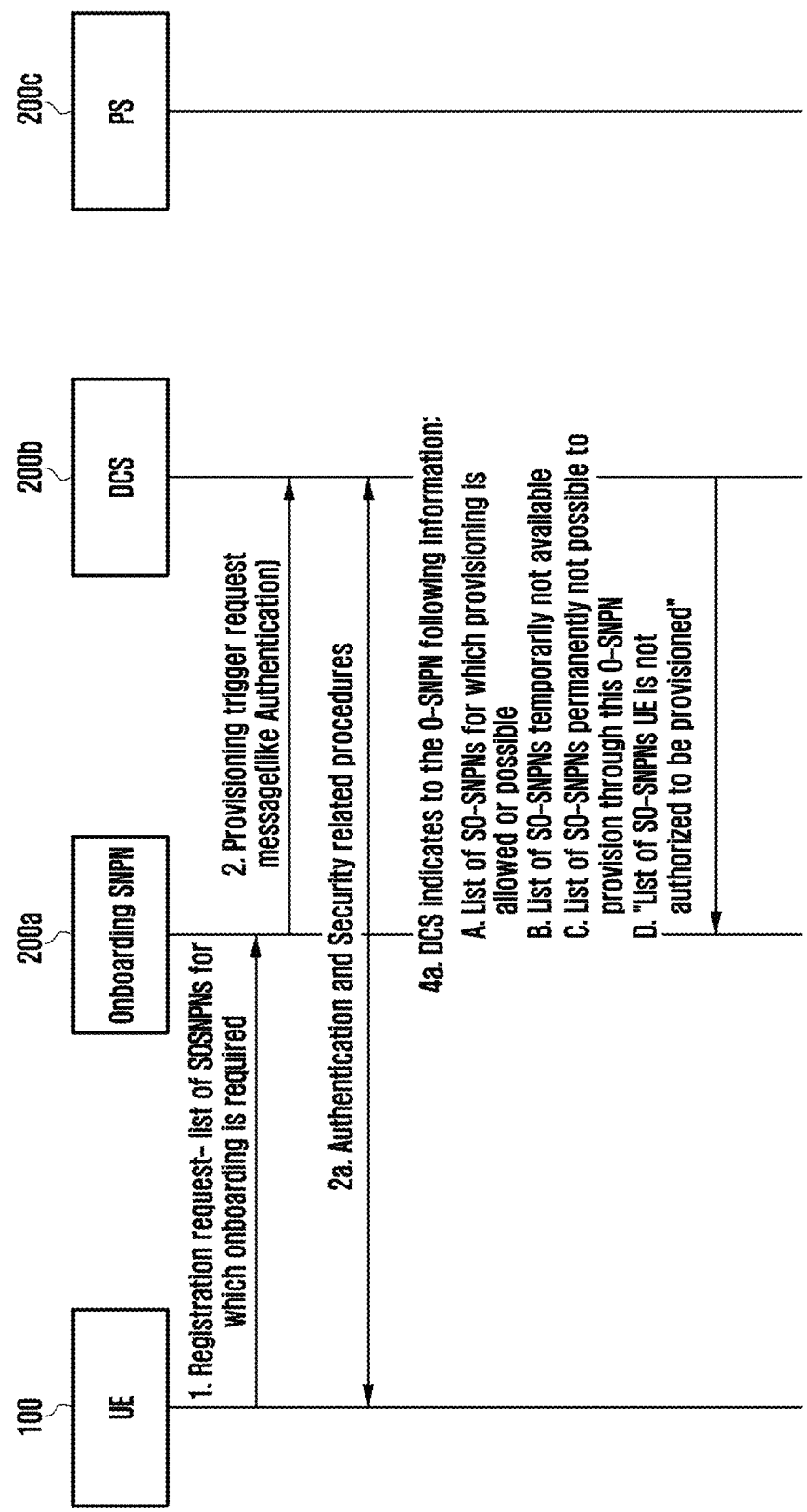
FIG. 9A illustrates an example scenario in which the UE manages the provisioning procedure in the wireless communication network, where the DCS indicates to the O-SNPN, the list of SO-SNPNs allowed based on the UE's subscription information, according to embodiments as disclosed herein.

FIG. 9A and FIG. 9B illustrate an example scenario in which the UE (100) manages the provisioning procedure in the wireless communication network (1000), where the DCS (200B) indicates to the O-SNPN (200*a*), the list of SO-SNPNs allowed based on the UE's subscription information, according to embodiments as disclosed herein.

As shown in FIG. 9A and FIG. 9B, the UE (100) triggers a registration procedure for onboarding purpose. The registration request may include the SO-SNPN for which provisioning is required to be done. Optionally, the provisioning server information has also been included. The SO-SNPN (for example, the AMF (200*d*)) will initiate an authentication request with the DCS (200B). After or during the authentication procedure, the DCS (200B) indicates to the SO-SNPN (for example, the AMF (200*d*)) the list of SO-SNPNs required to be provisioned for this UE (100). At this point, the DCS (200B) may have a list of SO-SNPNs for which provisioning is required. But, the DCS (200B) may not have agreements with some of those SO-SNPNs or some of the provisioning servers (200*c*) are not reachable temporarily based on this DCS (200B). The AMF (200*d*) indicates to the UE in a NAS message such as a REGISTRATION ACCEPT message one or more of the below information. Otherwise, if reaching the PS (200*c*) faces some abnormality after the registration procedure has been completed, the SO-SNPN, as part of another NAS message such as a UE configuration update, indicates to the UE (100) one or more of the below information:

1. List of SO-SNPNs for which provisioning is allowed or possible.
2. List of SO-SNPNs temporarily not available.
3. List of SO-SNPNs permanently not possible to provision through this O-SNPN (200*a*).
4. List of SO-SNPNs UE is not authorized to be provisioned.

On receiving "List of SO-SNPNs for which provisioning is allowed or possible", the UE (100) performs the following actions:

1. The UE (100) gets the provisioning done for the List of SO-SNPNs for which provisioning is allowed or possible.
2. In an embodiment, the UE (100) performs the deregistration procedure with the current O-SNPN (200*a*) and performs the PLMN SEARCH to select another O-SNPN to receive the provisioning information for all the required SO-SNPNs together.
3. In an embodiment, the UE (100) performs the deregistration procedure with the current O-SNPN (200*a*) and performs the PLMN SEARCH to select another O-SNPN to receive the provisioning information for the rest of the other SO-SNPNs after getting provisioned for the allowed SO-SNPNs on the current O-SNPN (200*a*).

On receiving "List of SO-SNPNs temporarily not available", the timer can be optionally provided along with this list, the UE (100) performs the following actions:

1. The UE (100) retries the provisioning for this List of SO-SNPNs temporarily not available after an implementation dependent time or after expiry of the timer received associated with it.
2. In an embodiment, the UE (100) performs the deregistration procedure with the current O-SNPN (200*a*) and performs the PLMN SEARCH to select another O-SNPN to receive the provisioning information for all the required SO-SNPNs together.

On receiving "List of SO-SNPNs permanently not possible to provision through this O-SNPN (200a)", the UE (100) performs the following actions:

1. The UE (100) gets the provisioning done for the List of SO-SNPNs for which provisioning is allowed or possible.

2. In an embodiment, the UE (100) performs the deregistration procedure with the current O-SNPN (200a) and performs the PLMN SEARCH to select another O-SNPN to receive the provisioning information for all the required SO-SNPNs together.

3. In an embodiment, the UE (100) performs the deregistration procedure with the current O-SNPN (200a) and performs the PLMN SEARCH to select another O-SNPN to receive the provisioning information for the rest of the other SO-SNPNs after getting provisioned for the allowed SO-SNPNs on the current O-SNPN (200a).

On receiving "List of SO-SNPNs UE is not authorized to be provisioned", the UE (100) performs the following actions:

The UE (100) does not try to get provisioned for those SO-SNPNs again. Optionally, this information is received from the DCS (200B) and protected by the DCS (200B). The UE (100) may attempt to get provisioned for those SO-SNPNs after an implementation dependent time, or the network can provide a timer value after which the UE (100) can again make an attempt or till the UE (100) does power off and on, i.e., switch off and on, i.e., the UE (100) goes back to the deregister state, and so on.

In this embodiment, after or during the authentication procedure indicates that the authentication procedure can be successful or authentication procedure is not successful.

Figure 10A:
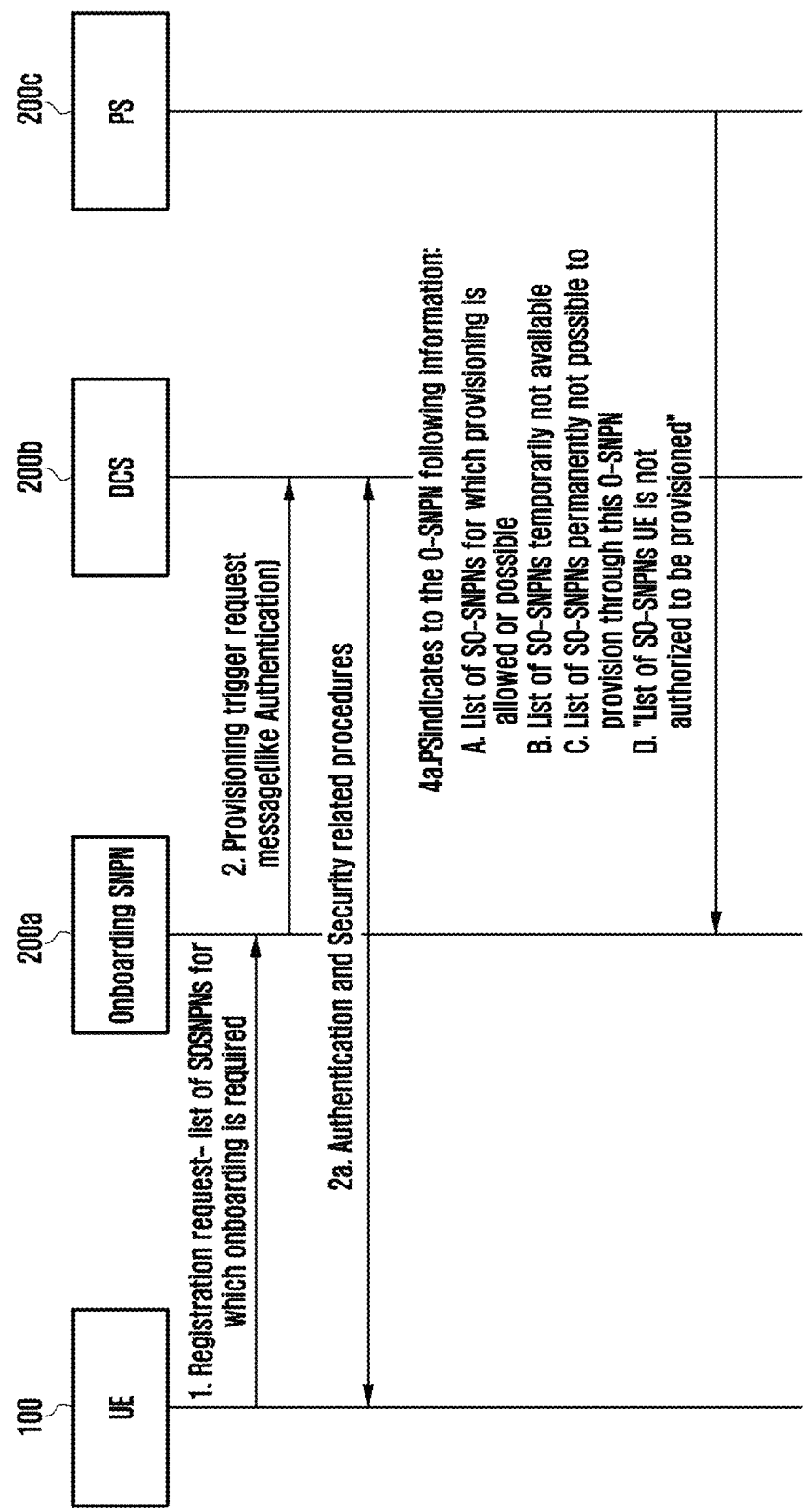
FIG. 10A illustrates an example scenario in which the UE manages the provisioning procedure in the wireless communication network, where the PS indicates to the O-SNPN list of the SO-SNPNs allowed, based on the UE's subscription information, according to embodiments as disclosed herein.

FIG. 10A and FIG. 10B illustrate an example scenario in which the UE (100) manages the provisioning procedure in the wireless communication network (1000), where the PS (200c) indicates to the O-SNPN (200a) a list of the SO-SNPNs allowed, based on the UE's subscription information, according to embodiments as disclosed herein.

As shown in FIG. 10A and FIG. 10B, the UE (100) triggers the registration procedure for on boarding purpose. The registration request may include the SO-SNPN for which provisioning is required to be done. Optionally, the provisioning server information is also included. The SO-SNPN (for example, the AMF (200d)) will initiate an authentication request with the DCS (200B). After or during the authentication procedure, the DCS (200B) indicates to the SO-SNPN (for example, the AMF (200d)) the list of SO-SNPNs required to be provisioned for this UE (100). At this point, the PS (200c) may have the list of the SO-SNPNs for which provisioning is required. But the PS (200c) may not have agreements with some of those SO-SNPNs based on this PS (200c) through the AMF (200d) indicates to the UE (100) in the NAS message such as a REGISTRATION ACCEPT message one or more of the below information. Otherwise if reaching the provisioning faces some abnormal situation after registration procedure is completed, the O-SNPN (200a) as part of another NAS message such as a UE configuration update indicates to the UE (100) one or more of the below information:

1. List of SO-SNPNs for which provisioning is allowed or possible.

2. List of SO-SNPNs temporarily not available.

3. List of SO-SNPNs permanently not possible to provision through this O-SNPN (200a).

4. List of SO-SNPNs that the UE (100) is not authorized to be provisioned.

On receiving "List of SO-SNPNs for which provisioning is allowed or possible", the UE (100) performs the following actions:

1. The UE (100) gets the provisioning done for the List of SO-SNPNs for which provisioning is allowed or possible.

2. In an embodiment, the UE (100) performs the deregistration procedure with the current O-SNPN (200a) and does the PLMN SEARCH to select another O-SNPN to receive the provisioning information for all the required SO-SNPNs together.

3. In an embodiment, the UE (100) performs a deregistration procedure with the current O-SNPN (200a) and does the PLMN SEARCH to select another O-SNPN to receive the provisioning information for the rest of the other SO-SNPNs after getting provisioned for the allowed SO-SNPNs on the current O-SNPN (200a).

On receiving "List of SO-SNPNs temporarily not available" optionally timer is provided along with this list, the UE (100) performs the following actions:

1. The UE (100) retries the provisioning for this List of SO-SNPNs temporarily not available after implementation dependent time or after expiry of the timer received associated with it.

2. In an embodiment, the UE (100) performs the deregistration procedure with the current O-SNPN (200a) and does the PLMN SEARCH to select another O-SNPN to receive the provisioning information for all the required SO-SNPNs together.

On receiving "List of SO-SNPNs permanently not possible to provision through this O-SNPN (200a)", the UE (100) performs the following actions:

1. The UE (100) gets the provisioning done for the List of SO-SNPNs for which provisioning is allowed or possible.

2. In an embodiment, the UE (100) performs the deregistration procedure with the current O-SNPN (200a) and does the PLMN SEARCH to select another O-SNPN to receive the provisioning information for all the required SO-SNPNs together.

3. In an embodiment, the UE (100) performs the deregistration procedure with the current O-SNPN (200a) and does the PLMN SEARCH to select another O-SNPN to receive the provisioning information for the rest of the other SO-SNPNs after getting provisioned for the allowed SO-SNPNs on the current O-SNPN (200a).

On receiving "List of SO-SNPNs UE is not authorized to be provisioned", the UE (100) performs the following actions:

The UE (100) does not try to get provisioned for those SO-SNPNs again. Optionally, this information is received from the DCS (200B) and protected by the DCS (200B). The UE (100) may attempt to get provisioned for this SO-SNPNs after an implementation dependent time, or the network can provide a timer value after which the UE (100) can again make an attempt or till the UE (100) does power off and on, i.e., switch off and on, i.e., the UE (100) goes back to the deregister state.

Figure 11:
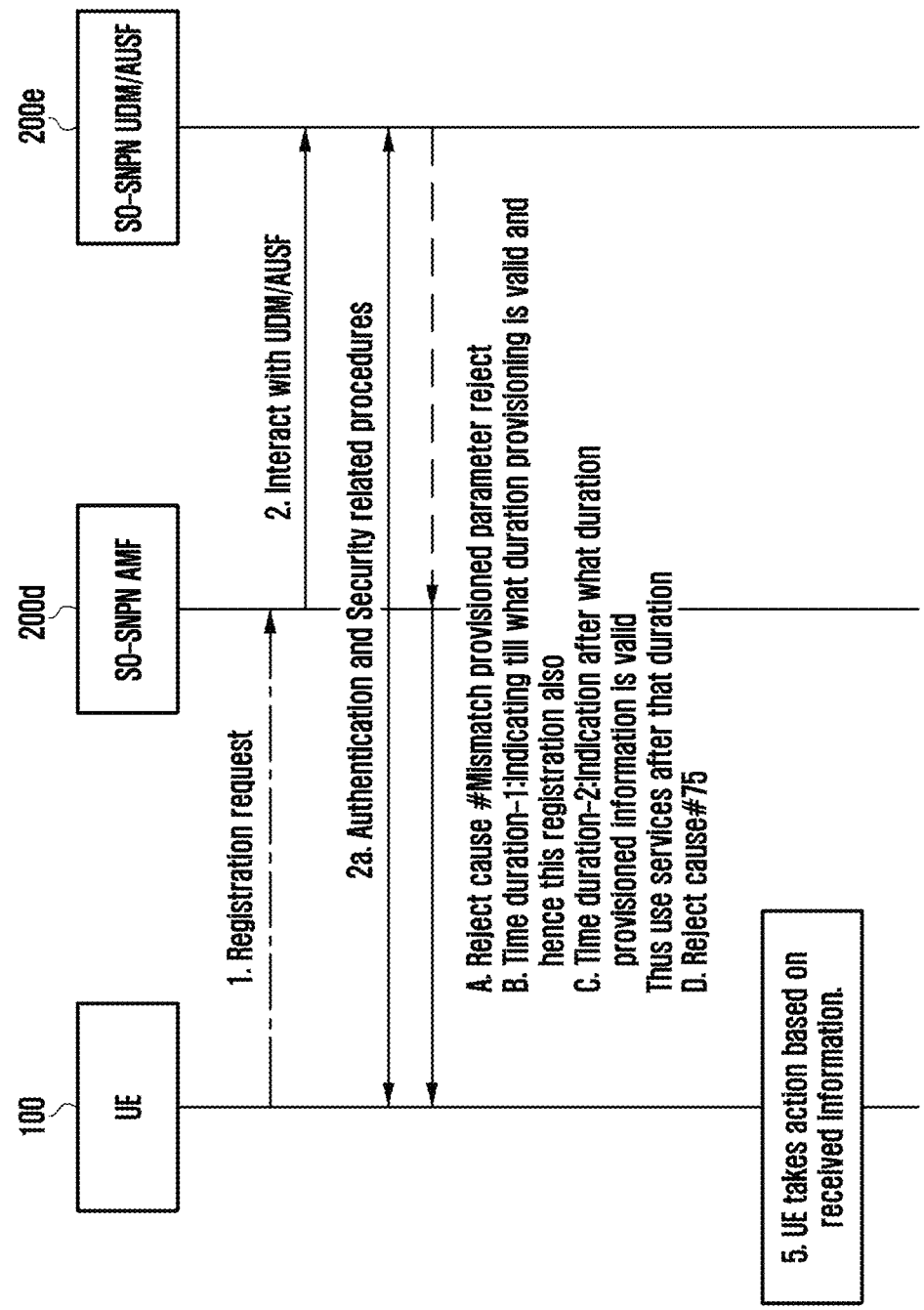
FIG. 11 illustrates an example scenario in which the UE manages the provisioning procedure in the wireless communication network, where the SO-SNPN indicates the validity of the provisioned information, according to embodiments as disclosed herein.

FIG. 11 illustrates an example scenario in which the UE (100) manages the provisioning procedure in the wireless communication network (1000), where the SO-SNPN indicates the validity of the provisioned information, according to embodiments as disclosed herein.

As shown in the FIG. 11, the UE (100) is onboarded with the default UE credentials. When the UE (100) attempts registration on the SO-SNPN, the SO-SNPN (by the AMF (200d) or by the AMF (200d) after interaction with the UDM/AUSF (200*e*)) indicates to the UE (100) with a NAS message such as a REGISTRATION REJECT, AUTHENTICATION REJECT:

Time duration-1: Till what duration the provisioned information is valid. After that duration, the UE (100) should mark the provisioning information as invalid or delete those contents from the UE (100).

Time duration-2: After what duration the provisioned information is valid. After that duration, the UE (100) can use the provisioned information and its valid. Before that instant, the UE (100) should not use the provisioned information for that particular SO-SNPN.

This information of time-duration discussed above can be sent to the UE (100) by a credential holder or the SO-SNPN or the PS (200*c*) or the DCS (200*b*) or the O-SNPN (200*a*) to the UE (100) during the onboarding procedure or during a normal service procedure like a NAS procedure example registration procedure indicating to the UE (100) when exactly the provisioned information is applicable in the UE (100). The UE (100) shall use the provisioned information like a given SO-SNPN only during the time duration assigned to the UE (100), i.e., the UE (100) should attempt to get service for example by initiating registration procedure using the credentials stored for SO-SNPN only during the time configured in the UE (100). This time can be how long the provisioned information is valid and after what duration this configured provisioned information is valid and in any combination of them for example which time of the day, day of the week or day of the month or day of the year. The time of the day can be defined as part of start time and end time. The time of the day can also be inferred by duration after start time of the configured provision information or in any combination of this. There can also be expiry time of the provisioned information in the UE (100).

Mismatch provisioned parameter reject (Incorrect provisioning): If the SO-SNPN identifies that any of the provisioned parameters are not correct or some of the required parameters are missing, it will be indicated to the UE (100). With this information, the UE (100) will restart the on boarding procedure again.

Reject cause#75 or some other cause value indicating that this SNPN is "Permanently not authorized for this SNPN": The UE (100) should optionally delete current default credentials of the current SNPN. If the UE (100) wants to receive service on same SNPN:

1. Then, the UE (100) should do on the boarding procedure again (if the default subscription credentials have been deleted).

2. The application in the UE (100) asks to retrigger registration on the same SNPN (if default subscription credentials have not been deleted, but have been marked as invalid). For example, because of the new QR code.

According to an embodiment, a method for managing an on-boarding procedure in a wireless communication network (1000), the method comprising: triggering, by a User Equipment (UE) (100), a registration request for an on-boarding procedure with a network entity (200), receiving, by the UE (100), a Non-access stratum (NAS) message comprising at least one information from the network entity (200) based on the registration request, performing, by the UE (100), at least one action based on the at least one received information, and managing, by the UE (100), the on-boarding procedure in the wireless communication network (1000) based on the at least one action.

In some embodiments, the network entity (200) comprises at least one of an onboarding Standalone Non-Public Network (SNPN) (200*a*), a Default Credential Server (DCS) (200B), a Provisioning Server (PS) (200*c*) and an Access and Mobility Management Function (AMF) entity (200*d*), wherein the registration request comprises a Subscription Owner-SNPS (SO-SNPN) for which on-boarding is required to be done and at least one of information of a provisioning server (200*b*) and at least one addresses associated with a DCS (200B), and wherein the NAS message comprises at least one of a registration accept message and a UE configuration update message.

In some embodiments, the at least one information comprises a list of Subscription Owner-SNPSs (SO-SNPNs) for which on-boarding is allowed, a list of SO-SNPNs temporarily not available, a list of SO-SNPNs permanently not possible to provision through an O-SNPN (200*a*), and a list of SO-SNPNs UE is not authorized to be provisioned, at least one DCS (200B) through which on-boarding is allowed, at least one DCS (200B) temporarily not available, at least one DCS (200B) permanently not possible to provision through the O-SNPN (200*a*), and at least one DCS UE is not authorized to be provisioned.

In some embodiments, the at least one action comprises in response to receiving a list of SO-SNPNs for which on-boarding is allowed, perform at least one of: obtain an on-boarding done for a list of SO-SNPNs for which on-boarding is allowed, perform a deregistration procedure with a current O-SNPN (200*a*) and a public land mobile network (PLMN) search to select another O-SNPN to receive an on-boarding information for all required SO-SNPNs, and perform a deregistration procedure with a current O-SNPN (200*a*) and the PLMN search to select another O-SNPN to receive the on-boarding information for the rest of other SO-SNPNs after getting provisioned for allowed SO-SNPNs on the current O-SNPN (200*a*), in response to receiving the information comprises a list of SO-SNPNs temporarily not available and a timer is provided along with the list of SO-SNPNs, perform at least one of: retry an on-boarding for a list of SO-SNPNs temporarily not available after one of a predefined time value and expiry of a timer received associated with the information, and perform a deregistration procedure with a current O-SNPN (200*a*) and a PLMN search to select another O-SNPN to receive the on-boarding information for all SO-SNPNs, in response to receiving the information comprising a list of SO-SNPNs permanently not possible to provision through the O-SNPN (200*a*), obtain an on-boarding done for a list of SO-SNPNs for which on-boarding is allowed, perform a deregistration procedure with the current O-SNPN (200*a*) and a PLMN search to select another O-SNPN to receive the on-boarding information for all required SO-SNPNs, and perform a deregistration procedure with a current O-SNPN (200*a*) and the PLMN search to select another O-SNPN to receive the on-boarding information for rest of the other SO-SNPNs after getting provisioned for the allowed SO-SNPNs on the current O-SNPN (200*a*), and in response to receiving the information comprising a list of SO-SNPNs the UE is not authorized to be provisioned, do not attempt to obtain the provisioned for the SO-SNPNs, wherein the information is received from a DCS (200B) and protected by the DCS (200B), wherein the UE (100) attempts to get provisioned for the SO-SNPNs based on a value associated with a timer; in response to receiving the information comprising at least one of DCSs (200B) for which on-boarding is allowed, obtain an on-boarding done for a list of DCSs (200B) for which on-boarding is allowed, perform a deregistration procedure with a current O-SNPN (200*a*) and a PLMN search to select another O-SNPN which support all the required DCS (200B) to receive an on-boarding information for all the required SO-SNPNs by the UE (100), and perform a deregistration procedure with a current O-SNPN (200*a*) and the PLMN search to select another O-SNPN to receive the on-boarding information for the rest of other SO-SNPNs for which the DCS (200B) support is not available in the current O-SNPN (200*a*), in response to receiving the information comprising at least one of DCSs (200B) temporarily not available and a timer is provided along with a DCSs (200B) list, retry an on-boarding for a list of SO-SNPNs for which DCSs (200B) not available temporarily after one of predefine time value or after expiry of a timer received associated with the information, and perform a deregistration procedure with a current O-SNPN (200*a*) and does a PLMN search to select another O-SNPN to receive the on-boarding information for all the required SO-SNPNs together for which DCSs (200B) are not available with the current O-SNPN (200*a*), in response to receiving the information comprising at least one of DCSs (200B) permanently not possible to provision through the O-SNPN (200*a*), obtain an on-boarding done for list of SO-SNPNs for which on-boarding is allowed, and perform a deregistration procedure with a current O-SNPN (200*a*) and a PLMN SEARCH to select another O-SNPN which supports all the DCSs (200B) to receive the on-boarding information for all the required SO-SNPNs, and in response to receiving the information comprising at least one of DCSs UE is not authorized to be provisioned, does not attempt to get provisioned for the SO-SNPNs again which are associated with the DCS (200B) present in the list of SO-SNPNs, wherein the information is received and protected from the DCS (200B) using an integrity protected message, wherein the information is protected by the DCS (200B), wherein the UE (100) attempts to get provisioned for the SO-SNPNs based on a value associated with a timer.

In some embodiments, wherein the at least one information comprises at least one of a reject cause indicating a mismatch provisioned parameter reject, a first time interval indicating an on-boarding and registration are valid up to the first time interval, a second time interval indicating a provisioned information valid after the second time interval, and a reject cause#75, wherein the at least one action comprises: perform at least one of: mark on-boarding information as invalid and delete the on-boarding information from the UE (100) after expiry of the first time interval, use the provisioned information as valid after the second time interval, restart the on boarding procedure when an SO-SNPN identifies that provisioned information is not correct and a required parameter associated with the provisioned information is missing and is indicated to the UE (100) in response to receiving a reject cause indicating a mismatch provisioned parameter reject, and perform at least one of: perform an on-boarding procedure if a default subscription credential is deleted, and an application running in the UE (100) to retrigger registration on the SNPN if the default subscription credential is not deleted and the default subscription credential is marked as invalid, when the reject cause#75 indicates that the SNPN is permanently not authorized for the SNPN and the UE (100) deletes a current default credential of the current SNPN.

In some embodiments, receiving, by the UE (100), the NAS message comprising at least one information from the network entity (200) based on the registration request comprises: performing an authentication and security related procedure using a network entity (200), and receiving, by the UE (100), the NAS message comprising at least one information from the network entity (200) based on the authentication and security related procedure.

According to an embodiment, a method for managing an on-boarding procedure in a wireless communication network (1000), the method comprising: receiving, by a network entity (200), a registration request for an on-boarding procedure from a User Equipment (UE) (100), sending, by the network entity (200), a Non-access stratum (NAS) message comprising at least one information to the UE (100) based on the registration request, and managing, by the network entity (200), the on-boarding procedure in the wireless communication network (1000) based on the at least one information.

In some embodiments, the network entity (200) comprises at least one of an onboarding Standalone Non-Public Network (SNPN), a Default Credential Server (DCS) (200B), a Provisioning Server (PS) (200*c*) and an Access and Mobility Management Function (AMF) entity (200*d*), wherein the registration request comprises a SO-SNPN for which on-boarding is required to be done and at least one of information of a provisioning server (200*c*) and at least one addresses associated with a DCS (200B), and wherein the NAS message comprises at least one of a registration accept message and a UE configuration update message.

In some embodiments, the at least one information comprises a list of Subscription Owner-SNPSs (SO-SNPNs) for which on-boarding is allowed, a list of SO-SNPNs temporarily not available, a list of SO-SNPNs permanently not possible to provision through an O-SNPN (200*a*), a list of SO-SNPNs the UE is not authorized to be provisioned, at least one information comprises at least one DCS (200B) through which on-boarding is allowed, at least one DCS (200B) temporarily not available, at least one DCS (200B) permanently not possible to provision through an O-SNPN (200*a*), and at least one DCS UE is not authorized to be provisioned.

In some embodiments, the at least one information comprises at least one of a reject cause indicating a mismatch provisioned parameter reject, a first time interval indicating an on-boarding and registration are valid up to the first time interval, a second time interval indicating a provisioned information valid after the second time interval, and a reject cause#75.

In some embodiments, sending, by the network entity (200), the NAS message comprising at least one information to the UE (100) based on the registration request comprises: performing, by the network entity (200), an authentication and security related procedure, and sending, by the network entity (200), the NAS message comprising at least one information to the UE (100) based on the authentication and security related procedure.

According to an embodiment, a network entity (200) for managing an on-boarding procedure in a wireless communication network (1000), the network entity (200) comprising a memory (230), a processor (240), and an on-boarding procedure handling controller (210), coupled with the memory (230) and the processor (240), configured to: receive a registration request for an on-boarding procedure from a User Equipment (UE) (100), send a Non-access stratum (NAS) message comprising at least one information to the UE (100) based on the registration request, and manage the on-boarding procedure in the wireless communication network (1000) based on the at least one information.

In some embodiments, the network entity comprises at least one of an onboarding Standalone Non-Public Network (SNPN), a Default Credential Server (DCS) (200B), a Provisioning Server (PS) (200*c*) and an Access and Mobility Management Function (AMF) entity (200*d*), wherein the registration request comprises a SO-SNPN for which on-boarding is required to be done and at least one of information of a provisioning server (200c) and at least one addresses associated with a DCS (200B), and wherein the NAS message comprises at least one of a registration accept message and a UE configuration update message.

In some embodiments, the at least one information comprises a list of Subscription Owner-SNPSs (SO-SNPNs) for which on-boarding is allowed, a list of SO-SNPNs temporarily not available, a list of SO-SNPNs permanently not possible to provision through an O-SNPN (200a), and a list of SO-SNPNs UE is not authorized to be provisioned, and wherein the at least one information comprises at least one DCS (200B) through which on-boarding is allowed, at least one DCS (200B) temporarily not available, at least one DCS (200B) permanently not possible to provision through an O-SNPN (200a), and at least one DCS UE is not authorized to be provisioned.

In some embodiments, the at least one information comprises at least one of a reject cause indicating a mismatch provisioned parameter reject, a first time interval indicating an on-boarding and registration are valid up to the first time interval, a second time interval indicating a provisioned information valid after the second time interval, and a reject cause#75.

In some embodiments, send the NAS message comprising at least one information to the UE (100) based on the registration request comprises perform an authentication and security related procedure, and send the NAS message comprising at least one information to the UE (100) based on the authentication and security related procedure.

The various actions, acts, blocks, steps, or the like in the flow charts (500 and 600) may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing an on-boarding procedure in a wireless communication network, the method comprising:
    triggering, by a User Equipment (UE), a registration request for an on-boarding procedure with a network entity;
    receiving, by the UE, a Non-access stratum (NAS) message comprising at least one a list of subscription owner-standalone non-public networks (SO-SNPNs) temporarily not available and a timer provided along with the list of SO-SNPNs from the network entity based on the registration request;
    in response to receiving the list of SO-SNPNs temporarily not available and a timer provided along with the list of SO-SNPNs, retrying an on-boarding for the list of SO-SNPNs temporarily not available after one of a predefined time value and expiry of a timer received associated with the list and
    managing, by the UE, the on-boarding procedure in the wireless communication network based on the retrying of the on-boarding.

2. The method as claimed in claim 1, wherein the network entity comprises at least one of an onboarding Standalone Non-Public Network (SNPN), a Default Credential Server (DCS), a Provisioning Server (PS) and an Access and Mobility Management Function (AMF) entity, wherein the registration request comprises a Subscription Owner-SNPS (SO-SNPN) for which on-boarding is required to be done and at least one of information of a provisioning server and at least one address associated with a DCS, and wherein the NAS message comprises at least one of a registration accept message and a UE configuration update message.

3. The method as claimed in claim 1, wherein the NAS message further comprises at least one of a list of Subscription Owner-Standalone Non-Public Networks (SO-SNPNs) for which on-boarding is allowed, a list of SO-SNPNs permanently not possible to provision through an Owner-Standalone Non-Public Network (O-SNPN), and a list of SO-SNPNs the UE is not authorized to be provisioned, at least one Default Credential Server (DCS) through which on-boarding is allowed, at least one DCS temporarily not available, at least one DCS permanently not possible to provision through the O-SNPN , and at least one DCS the UE is not authorized to be provisioned.

4. The method as claimed in claim 1, further comprising:
    in response to receiving a list of Subscription Owner-Standalone Non-Public Network (SO-SNPNs) for which on-boarding is allowed, performing at least one of:
        obtaining an on-boarding done for a list of SO-SNPNs for which on-boarding is allowed,
        performing a deregistration procedure with a current Owner-Standalone Non-Public Network (O-SNPN) and a public land mobile network (PLMN) search to select another O-SNPN to receive an on-boarding information for all required SO-SNPNs, and
        performing a deregistration procedure with a current O-SNPN and the PLMN search to select another O-SNPN to receive the on-boarding information for rest of other SO-SNPNs after getting provisioned for allowed SO-SNPNs on the current O-SNPN;
    in response to receiving information comprising a list of SO-SNPNs temporarily not available and a timer provided along with the list of SO-SNPNs,
        performing a deregistration procedure with a current O-SNPN and a PLMN search to select another O-SNPN to receive the on-boarding information for all SO-SNPNs;
    in response to receiving information comprising a list of SO-SNPNs permanently not possible to provision through the O-SNPN,
        obtaining an on-boarding done for a list of SO-SNPNs for which on-boarding is allowed,
        performing a deregistration procedure with the current O-SNPN and a PLMN search to select another O-SNPN to receive the on-boarding information for all required SO-SNPNs, and
        performing a deregistration procedure with a current O-SNPN and the PLMN search to select another O-SNPN to receive the on-boarding information for rest of the other SO-SNPNs after getting provisioned for the allowed SO-SNPNs on the current O-SNPN ; and
    in response to receiving information comprising a list of SO-SNPNs the UE is not authorized to be provisioned, not attempting to obtain the provisioned for the SO-SNPNs, wherein the information is received from a Default Credential Server (DCS) and protected by the DCS, wherein the UE attempts to get provisioned for the SO-SNPNs based on a value associated with a timer;

in response to receiving information comprising at least one of DCSs for which on-boarding is allowed,
obtaining an on-boarding done for a list of DCSs for which on-boarding is allowed,
performing a deregistration procedure with a current O-SNPN and a PLMN search to select another O-SNPN which supports all required DCS to receive an on-boarding information for all the required SO-SNPNs by the UE, and
performing a deregistration procedure with a current O-SNPN and does the PLMN search to select another O-SNPN to receive the on-boarding information for rest of other SO-SNPNs for which the DCS support is not available in the current O-SNPN;

in response to receiving the information comprising at least one of DCSs temporarily not available and a timer is provided along with a DCSs list,
retrying an on-boarding for a list of SO-SNPNs for which DCSs not available temporarily after one of predefine time value or after expiry of a timer received associated with the information, and
performing a deregistration procedure with a current O-SNPN and does a PLMN search to select another O-SNPN to receive the on-boarding information for all the required SO-SNPNs together for which DCSs are not available with the current O-SNPN, in response to receiving the information comprising at least one of DCSs permanently not possible to provision through the O-SNPN,
obtaining an on-boarding done for list of SO-SNPNs for which on-boarding is allowed, and
performing a deregistration procedure with a current O-SNPN and does a PLMN SEARCH to select another O-SNPN which supports all the DCSs to receive the on-boarding information for all the required SO-SNPNs; and in response to receiving the information comprising at least one of DCSs the UE is not authorized to be provisioned,
not attempting to get provisioned for the SO-SNPNs again which are associated with the DCS present in the list of SO-SNPNs, wherein the information is received and protected from the DCS using an integrity protected message, wherein the information is protected by the DCS, wherein the UE attempts to get provisioned for the SO-SNPNs based on a value associated with a timer.

5. The method as claimed in claim 1, further comprising:
wherein the NAS message comprises at least one of a reject cause indicating a mismatch provisioned parameter reject, a first time interval indicating an on-boarding and registration are valid up to the first time interval, a second time interval indicating a provisioned information valid after the second time interval, and a reject cause#75,
marking on-boarding information as invalid and deleting the on-boarding information from the UE after expiry of the first time interval;
using the provisioned information as valid after the second time interval;

restarting the on boarding procedure when a Subscription Owner-Standalone Non-Public Network (SO-SNPN) identifies that provisioned information is not correct and a required parameter associated with the provisioned information is missing and is indicated to the UE in response to receiving a reject cause indicating a mismatch provisioned parameter reject; and performing at least one of: perform an on-boarding procedure if a default subscription credential is deleted, and an application running in the UE to retrigger registration on the SNPN if the default subscription credential is not deleted and the default subscription credential is marked as invalid, when the reject cause#75 indicates that the SNPN is permanently not authorized for the SNPN and the UE deletes a current default credential of current Standalone Non-Public Network (SNPN).

6. The method as claimed in claim 1, wherein receiving, by the UE, the NAS message from the network entity based on the registration request comprises:
performing an authentication and security related procedure using a network entity; and
receiving, by the UE, the NAS message comprising at least one information from the network entity based on the authentication and security related procedure.

7. A method for managing an on-boarding procedure in a wireless communication network, the method comprising:
receiving, by a network entity, a registration request for an on-boarding procedure from a User Equipment (UE);
transmitting, by the network entity, a Non-access stratum (NAS) message comprising a list of subscription owner-standalone non-public networks (SO-SNPNs) temporarily not available and a timer provided along with the list of SO-SNPNs to the UE based on the registration request; and
managing, by the network entity, the on-boarding procedure in the wireless communication network based on the NAS message,
wherein in response to the NAS message transmitted to the UE, the UE retries an on-boarding for the list of SO-SNPNs temporarily not available after one of a predefined time value and expiry of a timer received associated with the list.

8. The method as claimed in claim 7, wherein the network entity comprises at least one of an onboarding Standalone Non-Public Network (SNPN), a Default Credential Server (DCS), a Provisioning Server (PS) and an Access and Mobility Management Function (AMF) entity, wherein the registration request comprises a Subscription Owner-Standalone Non-Public Network (SO-SNPN) for which on-boarding is required to be done and at least one of information of a provisioning server and at least one addresses associated with a DCS, and wherein the NAS message comprises at least one of a registration accept message and a UE configuration update message.

9. The method as claimed in claim 7, wherein the NAS message further comprises at least one of a list of Subscription Owner-Standalone Non-Public Network (SO-SNPNs) for which on-boarding is allowed, a list of SO-SNPNs permanently not possible to provision through an Owner-Standalone Non-Public Network (O-SNPN), a list of SO-SNPNs the UE is not authorized to be provisioned, at least one information comprises at least one Default Credential Server (DCS) through which on-boarding is allowed, at least one DCS temporarily not available, at least one DCS permanently not possible to provision through an O-SNPN, and at least one DCS UE is not authorized to be provisioned.

10. The method as claimed in claim 7, wherein the NAS message further comprises at least one of a reject cause indicating a mismatch provisioned parameter reject, a first time interval indicating an on-boarding and registration are valid up to the first time interval, a second time interval indicating a provisioned information valid after the second time interval, and a reject cause#75.

11. The method as claimed in claim 7, wherein sending, by the network entity, the NAS message to the UE based on the registration request comprises:
   performing, by the network entity, an authentication and security related procedure; and
   sending, by the network entity, the NAS message comprising at least one information to the UE based on the authentication and security related procedure.

12. A network entity for managing an on-boarding procedure in a wireless communication network, the network entity comprising:
   a memory;
   a processor; and
   an on-boarding procedure handling controller, coupled with the memory and the processor, configured to:
      receive a registration request for an on-boarding procedure from a User Equipment;
      transmit a Non-access stratum (NAS) message comprising a list of subscription owner-standalone non-public networks (SO-SNPNs) temporarily not available and a timer provided along with the list of SO-SNPNs to the UE based on the registration request; and
      manage the on-boarding procedure in the wireless communication network based on the NAS message,
   wherein in response to the NAS message transmitted to the UE, the UE retries an on-boarding for the list of SO-SNPNs temporarily not available after one of a predefined time value and expiry of a timer received associated with the list.

13. The network entity as claimed in claim 12, wherein the network entity comprises at least one of an onboarding Standalone Non-Public Network (SNPN), a Default Credential Server (DCS), a Provisioning Server (PS) and an Access and Mobility Management Function (AMF) entity, wherein the registration request comprises a Subscription Owner-Standalone Non-Public Network (SO-SNPN) for which on-boarding is required to be done and at least one of information of a provisioning server and at least one address associated with a DCS, and wherein the NAS message comprises at least one of a registration accept message and a UE configuration update message.

14. The network entity as claimed in claim 12, wherein the NAS message further comprises:
   at least one of a list of Subscription Owner-Standalone Non-Public Networks (SO-SNPNs) for which on-boarding is allowed, a list of SO-SNPNs permanently not possible to provision through an Owner-Standalone Non-Public Network (O-SNPN), and a list of SO-SNPNs the UE is not authorized to be provisioned, and
   at least one Default Credential Server (DCS) through which on-boarding is allowed, at least one DCS temporarily not available, at least one DCS permanently not possible to provision through an O-SNPN , and at least one DCS the UE is not authorized to be provisioned.

15. The network entity as claimed in claim 12, wherein the NAS message further comprises at least one of a reject cause indicating a mismatch provisioned parameter reject, a first time interval indicating an on-boarding and registration are valid up to the first time interval, a second time interval indicating a provisioned information valid after the second time interval, and a reject cause#75.

16. The network entity as claimed in claim 12, wherein to send the NAS message to the UE based on the registration request, the on-boarding procedure handling controller is further configured to:
   perform an authentication and security related procedure; and
   send the NAS message comprising at least one information to the UE based on the authentication and security related procedure.

* * * * *